US012372909B2

(12) United States Patent
Takenaka

(10) Patent No.: US 12,372,909 B2
(45) Date of Patent: Jul. 29, 2025

(54) DAMAGE DETECTION IMAGE FORMING APPARATUS

(71) Applicant: Toshiba Tec Kabushiki Kaisha, Tokyo (JP)

(72) Inventor: Sunao Takenaka, Odawara Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/467,301

(22) Filed: Sep. 14, 2023

(65) Prior Publication Data

US 2025/0093807 A1 Mar. 20, 2025

(51) Int. Cl.
*G03G 15/02* (2006.01)
*G03G 15/00* (2006.01)

(52) U.S. Cl.
CPC ..... *G03G 15/5037* (2013.01); *G03G 15/0216* (2013.01); *G03G 15/0266* (2013.01)

(58) Field of Classification Search
USPC ........................................................ 399/50
See application file for complete search history.

(56) References Cited

U.S. PATENT DOCUMENTS

| | | | | |
|---|---|---|---|---|
| 4,890,125 A * | 12/1989 | Egawa | G03G 15/0266 | 347/137 |
| 5,546,172 A * | 8/1996 | Seto | G03G 15/1645 | 399/311 |
| 2014/0105621 A1 | 4/2014 | Imanaka et al. | | |
| 2015/0177665 A1* | 6/2015 | Saito | G03G 15/5037 | 399/25 |

FOREIGN PATENT DOCUMENTS

| | | |
|---|---|---|
| JP | 2005-352162 A | 12/2005 |
| JP | 2010-210909 A | 9/2010 |
| JP | 2019-184847 A | 10/2019 |

* cited by examiner

*Primary Examiner* — Quana Grainger
(74) *Attorney, Agent, or Firm* — FOLEY & LARDNER LLP

(57) ABSTRACT

According to one embodiment, an image forming system includes a photoreceptor system, first and second detection system, a controller, and a determination system. The photoreceptor system having a rotational shaft in a longitudinal direction. The first detection system detects whether there is an abnormality on a surface of the cylindrical photoreceptor system at a first position. The second detection system detects whether there is the abnormality on the surface of the cylindrical photoreceptor system at a second position. The controller causes the second detection system to start detecting of the abnormality at a point in time after a waiting time. The determination system determines damage occurred at a surface position of the surface of the cylindrical photoreceptor system if the second detection system detects the abnormality at the surface position at which the first detection system detected the abnormality.

16 Claims, 15 Drawing Sheets

FIG. 12

641 (642)

| PERIOD ID | DETECTED VALUE di (dv) | | | | |
|---|---|---|---|---|---|
| | 1 | 2 | 3 | ··· | n |
| ① | | | | | |
| ② | | | | | |
| ⋮ | ⋮ | ⋮ | ⋮ | ⋮ | ⋮ |

FIG. 13

643

| DETECTED AMOUNT ID | PERIOD | | | |
|---|---|---|---|---|
| | ① | ② | ③ | ··· |
| Δdi | | | | |
| Δdv | | | | |

644

| DETECTED VALUE ID | TIME | | | |
|---|---|---|---|---|
| | 1 | 2 | 3 | ... |
| di | | | | |
| dv | | | | |

DAMAGE DETECTION IMAGE FORMING APPARATUS

TECHNICAL FIELD

Embodiments described herein relate generally to an image forming apparatus.

BACKGROUND

Image forming apparatuses using an electrophotographic system are widely used as image forming apparatuses located at workplaces. An image forming apparatus using an electrophotographic system includes: a photoreceptor serving as an image carrier on which an electrostatic latent image is formed; a charge roller uniformly charging the surface of the photoreceptor by applying a voltage to a charging member close to the surface of the photoreceptor; an exposure unit forming a latent image on the photoreceptor; a developing unit close to the photoreceptor and performing development; a primary transfer unit transferring a developed toner image on the photoreceptor to a transfer body; a secondary transfer unit transferring the toner image transferred to the transfer body to a sheet; a photoreceptor cleaner coming into contact with the photoreceptor and removing remaining toner after transfer; and a transfer body cleaner coming into contact with the transfer body and removing remaining toner after transfer.

In the image forming apparatus using such an electrophotographic system, a photoreceptor is an important component that has a central role in image forming. Accordingly, if there is damage such as a flaw in the photoreceptor, a critical problem occurs in many cases in image forming. Therefore, if damage occurred in the photoreceptor, it is necessary to detect the damage as quickly as possible and take countermeasures such as exchange of the component quickly before the damage spreads.

In the related art, as a method of detecting damage such as a flaw occurred in the photoreceptor, a technique for detecting a flaw of the photoreceptor from periodicity of a variation in a current value flowing when applying a bias from the charging roller to the photoreceptor is known. However, the current value varies at a drum period of driving noise or the like in many cases, and thus there is a high possibility of a drum period noise being erroneously detected as a flaw of the photoreceptor.

BRIEF DESCRIPTION OF THE FIGURES

FIG. 12 is a diagram illustrating an example of stored content of a first or second detected value storage unit included in a nonvolatile memory in the image forming apparatus;

FIG. 13 is a diagram illustrating an example of stored content of a detected amount storage unit included in the nonvolatile memory;

DETAILED DESCRIPTION

In general, according to one embodiment, an image forming system includes a photoreceptor (or photoreceptor system), first and second detection units (e.g., where "unit" or "units" referred to herein may refer to any mechanical or electromechanical components, systems, assemblies, or subsystems involved in the conveyance, registration, transfer, fixing, or image forming processes within the printer, including but not limited to rollers, belts, motors, sensors, or combinations thereof), a control unit (or control system, or controller), and a determination unit. The photoreceptor has a rotational shaft in a longitudinal direction. The first detection unit detects whether there is abnormality on a surface of the photoreceptor at a first position with respect to the photoreceptor. The second detection unit detects whether there is abnormality on the surface of the photoreceptor at a second position with respect to the photoreceptor. The control unit causes the second detection unit to start detecting abnormality at a time point (e.g., point in time, moment, instance, moment of activation, activation moment, timestamp reference) at which a waiting time (e.g., waiting period, latency, delay, time interval) which is a time necessary for the photoreceptor to rotate by a distance between the first and second positions passed after the first detection unit started detecting abnormality. The determination unit determines that damage occurred at a surface position (e.g., location) of the photoreceptor if the second detection unit also detects that there is abnormality at the surface position of the photoreceptor at which the first detection unit detected that there is abnormality.

Hereinafter, an image forming system according to embodiments will be described. In each drawing used to describe the following embodiments, scales of units (e.g., unit scale, measurements) are changed appropriately. In each drawing used to describe the following embodiments, configurations are omitted appropriately.

First Embodiment

Figure 1:
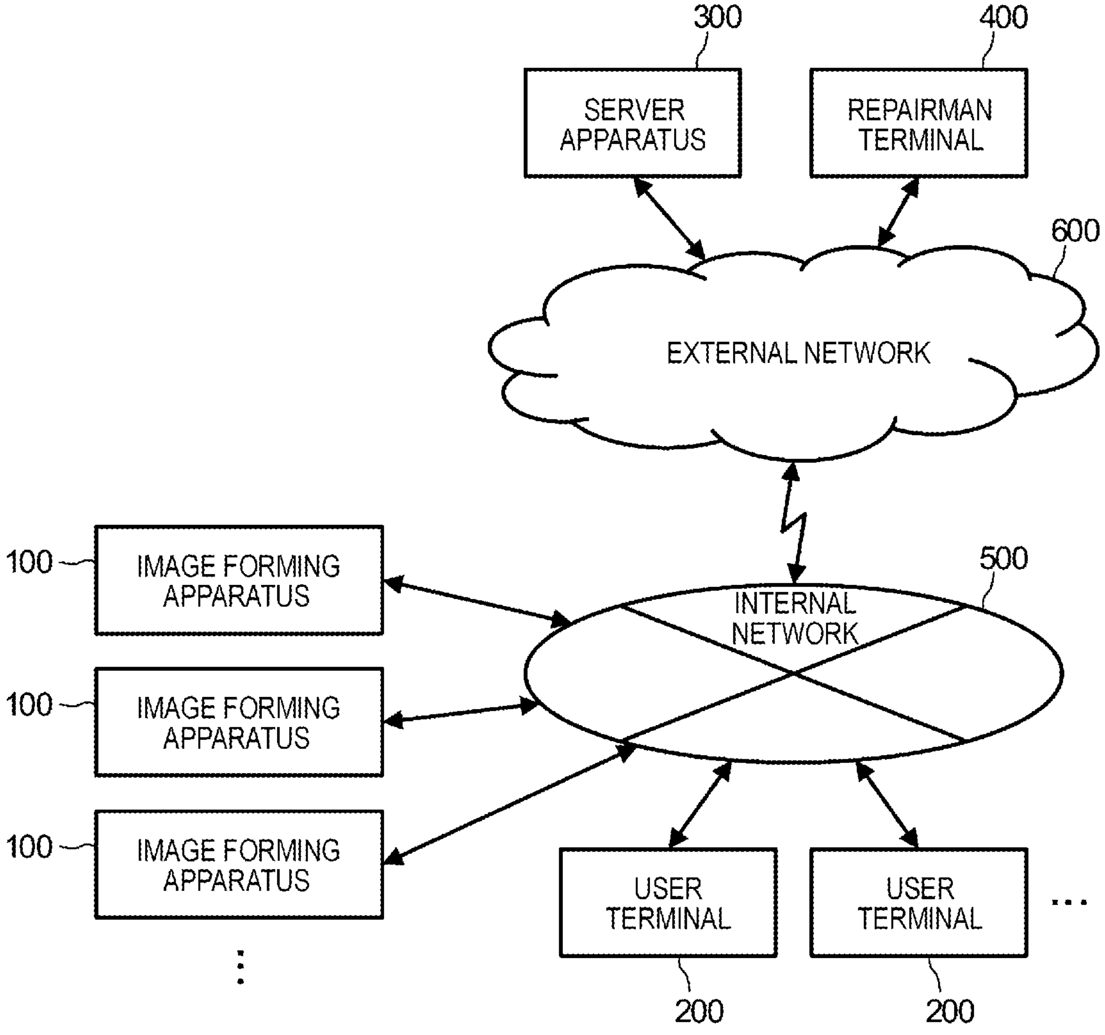
FIG. 1 is a diagram illustrating a schematic configuration of an image forming system according to an embodiment.

FIG. 1 is a diagram illustrating a schematic configuration of an image forming system according to a first embodiment. The image forming system includes one or more image forming apparatuses 100 (or image forming systems), one or more user terminals 200, a server apparatus 300, and one or more repairman terminals 400 (e.g., where "apparatus" or "apparatuses" referred to herein may refer to any type of electronic device, system, or hardware component configured to perform a specific function or set of functions, including but not limited to printers, copiers, scanners, fax machines, or combinations thereof). The image forming apparatuses 100 may be multi-function peripherals (hereinafter abbreviated to MFPs) that have at least a scanning function and a printing function. The image forming apparatus 100 is located at a workplace and can be connected to be able to communicate with the user terminal 200 disposed at, for example, the same workplace via an internal network 500 such as a local area network (LAN). The connection may be wired connection or wireless connection. The internal network 500 is connected to an external network 600 such as an Internet. The server apparatus 300 (or server system) and the repairman terminal 400 are connected to the external network 600. Accordingly, the image forming apparatus 100 can be connected to be able to communicate with the server apparatus 300 via the internal network 500 and the external network 600.

The user terminal 200 is an information processing apparatus such as a personal computer (PC), a smartphone, a tablet terminal, or a digital camera that gives a printing instruction to any image forming apparatus 100. The user terminal 200 may be connected to be able to communicate with the image forming apparatus 100 via the external network 600 and the internal network 500. That is, the user terminal 200 may be located outside of the workplace at which the image forming apparatus 100 is located. The user terminal 200 may be connected directly to the image forming apparatus 100 without involving the external network 600 and the internal network 500, that is, connected locally. The local network may also be wired connection or wireless connection.

The server apparatus 300 is, for example, a computer apparatus that is operated directly by a management company undertaking maintenance of the image forming apparatus 100 or is entrusted to and operated by a service providing company. The server apparatus 300 acquires data indicating an operation status of each image forming apparatus 100 periodically or as necessary or acquires notification data such as an alert transmitted from the image forming apparatus 100. Based on the acquired data, the server apparatus 300 determines whether it is necessary to inspect or repair each image forming apparatus 100. If there is an image forming apparatus 100 of which inspection or repair is necessary, the server apparatus 300 transmits information for specifying the image forming apparatus 100 to the repairman terminal 400, so that a repairman can inspect or repair the image forming apparatus 100.

The repairman terminal 400 is an information processing apparatus such as a smartphone or a tablet terminal (e.g., any portable electronic device, such as a smartphone, tablet, laptop, or handheld computer) carried by a repairman who inspects or repairs the image forming apparatus 100. Only one repairman terminal 400 is illustrated in FIG. 1, but the image forming system can include a plurality of repairman terminals 400. Here, the server apparatus 300 can also allocate an appropriate repairman to the image forming apparatus 100 of which inspection or repair is necessary based on information such as positional information of each repairman or a free status of each repairman using a position detection function of the repairman terminal 400.

Figure 2:
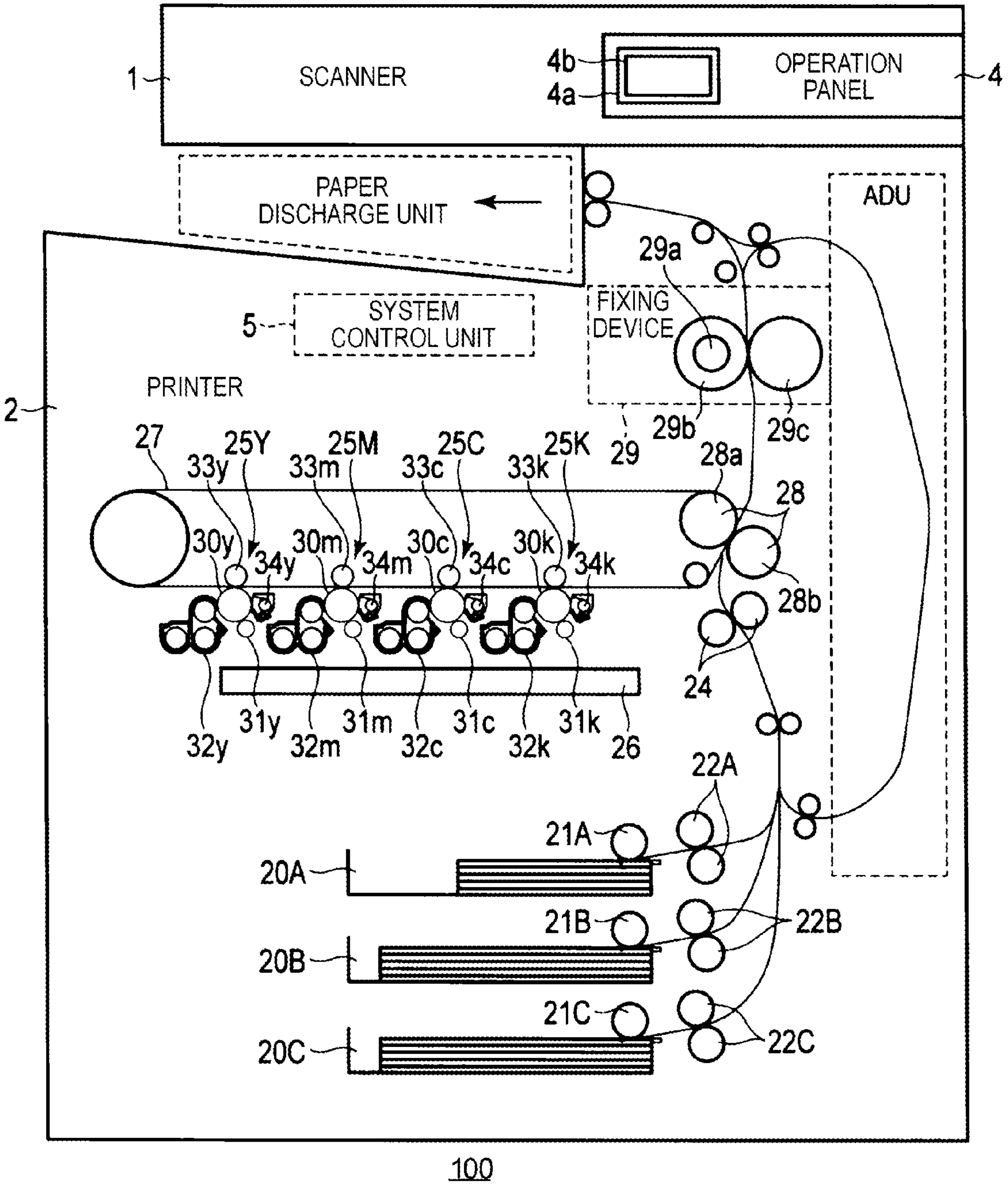
FIG. 2 is a sectional view roughly illustrating a configuration example of an image forming apparatus in FIG. 1.

FIG. 2 is a sectional view roughly illustrating a configuration example of the image forming apparatus 100. The image forming apparatus illustrated in FIG. 2 is an MFP and includes a scanner 1, a printer 2, an operation panel 4, and a system control unit 5.

The scanner 1 is a device that reads an image of a document and converts the read image into image data. The scanner 1 is configured with, for example, a charge coupled device (CCD) line sensor that converts an image on a reading surface (e.g., scanning area) of a document into image data. The scanner 1 may be a scanner that has a function of scanning a document put on a glass document table (e.g., or platen, document platform). The scanner 1 may be a scanner that has a function of reading an image of a document conveyed by an auto document feeder (ADF). The scanner 1 is installed on, for example, the upper part of the body of the MFP. The scanner 1 is controlled by the system control unit 5. The scanner 1 outputs image data of a document to the system control unit 5.

The printer 2 is an electrophotographic printer (e.g., laser printer). The printer 2 forms an image on a sheet which is a recording medium. The printer 2 has a color printing function of printing a color image on a sheet and a monochromic printing function of printing a monochromic (for example, black) image on a sheet. The printer 2 forms a color image using toners of a plurality of colors (for example, three colors of yellow (Y), cyan (C), and magenta (M)). The printer 2 forms a monochromic image using monochrome (for example, black (K)) toner.

In the configuration example illustrated in FIG. 2, the printer 2 includes paper feed cassettes 20 (20A, 20B, and 20C, e.g., paper trays). The paper feed cassettes 20 are paper feed units that supply sheets which are media on which images are printed. The printer 2 may include manual feed trays or the like as the paper feed units. For example, the paper feed cassettes 20A, 20B, and 20C are provided to be detachable on the lower part of the body of the MFP. The paper feed cassettes 20A, 20B, and 20C accommodate sheets of predetermined types (for example, sizes or sheet qualities).

The paper feed cassettes 20A, 20B, and 20C include pickup rollers 21A, 21B, and 21C, respectively. The pickup rollers 21A, 21B, and 21C pick up sheets one by one from the paper feed cassettes 20A, 20B, and 20C, respectively. The pickup rollers 21A, 21B, and 21C supply the picked-up sheets to a conveyance path (conveyance unit 22) including a plurality of conveyance rollers 22A, 22B, and 22C.

The conveyance unit 22 conveys sheets inside the printer 2. For example, the conveyance unit 22 conveys sheets picked up by the pickup rollers 21A, 21B, and 21C to registration rollers 24. The registration rollers 24 convey a sheet to a transfer position at a timing (e.g., point in time, moment, interval) at which an image is to be transferred from a transfer belt 27 to the sheet. The conveyance unit 22 conveys the sheet passed through the registration rollers 24 to the transfer position. The conveyance unit 22 conveys the sheet passed through the transfer position from the transfer position to a fixing device 29. The conveyance unit 22 conveys the sheet passed through the fixing device 29 to either a paper discharge unit or an automatic double-sided unit (ADU).

Image forming units 25 (25Y, 25M, 25C, and 25K) form images (e.g., generate or create graphics) to be transferred to the sheet. In the configuration example illustrated in FIG. 2, the image forming unit 25Y forms an image with yellow toner. The image forming unit 25M forms an image with magenta toner. The image forming unit 25C forms an image with cyan toner. The image forming unit 25K forms an image with black toner.

Each image forming unit 25 (25Y, 25M, 25C, and 25K) includes a photoreceptor drum 30 (30*y*, 30*m*, 30*c*, and 30*k*), a charge roller 31 (31*y*, 31*m*, 31*c*, and 31*k*), a developing unit 32 (32*y*, 32*m*, 32*c*, and 32*k*), a primary transfer roller 33 (33*y*, 33*m*, 33*c*, and 33*k*), and a photoreceptor cleaner 34 (34*y*, 34*m*, 34*c*, and 34*k*).

The photoreceptor drum 30 is a photoreceptor that includes a cylindrical drum (e.g., cylindrical photoreceptor system) that has a rotational shaft in a longitudinal direction and a photosensitive layer formed on the outer surface of the drum. The photoreceptor drum 30 is rotated about the rotational shaft at a constant speed by power delivered from a motor (e.g., an electric, hydraulic, or pneumatic machine that converts energy into mechanical force to rotate the photoreceptor drum 30). The charge roller 31 is a charged member that is close to (e.g., adjacent to, proximate to) the surface of the photoreceptor drum 30 and charges the surface of the photoreceptor drum 30 with a predetermined potential (e.g., a specific electrical voltage or charge level). The developing unit 32 develops electrostatic latent images formed on the photoreceptor drum 30 with the toner. The primary transfer roller 33 transfers toner images developed on the photoreceptor drum 30 to the transfer belt 27. The photoreceptor cleaner 34 cleans the surface of the photoreceptor drum 30 after transfer.

The exposure unit 26 forms the electrostatic latent images on the photoreceptor drums 30 of the image forming units 25 (25Y, 25M, 25C, and 25K) by laser light. As such, the photoreceptor drums 30 are image carriers (e.g., imaging drums, photoconductor) on which the electrostatic latent images are formed. The exposure unit 26 irradiates the photoreceptor drums 30 with the laser light controlled according to image data via an optical system such as a polygon mirror. The electrostatic latent images are formed on the surface of each photoreceptor drum 30 with the laser light from the exposure unit 26. The exposure unit 26 controls the laser light according to a control signal from the system control unit 5.

Each of the image forming units 25 (25Y, 25M, 25C, and 25K) develops an electrostatic latent image formed on each photoreceptor drum 30 by each developing unit 32. Each developing unit 32 includes a developing container that includes a developing roller. The developing container contains toner as developer of each color. The toner is stirred together with carriers inside the developing container to be charged. A developing bias (e.g., charge voltage) is applied to the developing roller. The developing roller to which the developing bias is applied supplies the toner to the electrostatic latent image on the photoreceptor drum 30. The electrostatic latent image on the photoreceptor drum 30 is developed as a toner image with the supplied toner.

The transfer belt 27 is an intermediate transfer body. Each of the image forming units 25 (25Y, 25M, 25C, and 25K) transfers (performs primary transfer of) the toner image formed on the photoreceptor drum 30 to the transfer belt 27 by applying (e.g., administering, imparting, imposing, providing) a primary transfer voltage to the transfer belt 27 by the primary transfer roller 33. For example, in the image forming unit 25K, the primary transfer roller 33*k* transfers the toner image developed with the black toner by the developing unit 32*k* to the transfer belt 27. Specifically, the primary transfer roller 33*k* is located at a position facing the photoreceptor drum 30*k* with the transfer belt 27 interposed therebetween. The primary transfer unit includes the transfer belt 27 and the primary transfer roller 33*k*. The primary transfer roller 33*k* brings the transfer belt 27 into contact with the photoreceptor drum 30*k* and sets positive polarity which is a potential opposite to the surface of the photoreceptor drum 30*k*, and thus draws the toner of the surface of the photoreceptor drum 30*k*. Accordingly, the primary transfer roller 33*k* transfers the toner image formed on the photoreceptor drum 30*k* to the transfer belt 27. If a color image is formed, each of the image forming units 25Y, 25M, 25C, and 25K transfers and overlaps the toner images developed with the toner of each color on the transfer belt 27.

The photoreceptor cleaner 34 is configured with a blade or the like that comes into contact with the surface of the photoreceptor drum 30. The photoreceptor cleaner 34 removes the toner remaining on the surface of the photoreceptor drum 30 using the blade. Between the photoreceptor cleaner 34 and the charge roller 31, a static eliminator that eliminates a remaining charge potential of the photoreceptor drum 30 may be provided.

The transfer unit 28 transfers (performs secondary transfer of) the toner image on the transfer belt 27 to a sheet at a secondary transfer position. The secondary transfer position is a position at which the toner image on the transfer belt 27 is transferred to the sheet. The secondary transfer position is a position at which a support roller 28*a* and a secondary transfer roller 28*b* face each other (e.g., oppose or are in opposition to).

The fixing device 29 fixes the toner to the sheet. The fixing device 29 gives fixing heat (e.g., applies heat, imparts thermal energy) to the sheet. In the example illustrated in FIG. 2, the fixing device 29 includes a heat roller 29*b* equipped with a heat unit 29*a* and a pressure roller 29*c* coming into contact with a fixing belt heated by the heat roller 29*b* in a pressured state. The heat unit 29*a* may be any heater as long as the heater can control a temperature. For example, the heat unit 29*a* may be configured with a heater lamp such as a halogen lamp or may be a heater of an induction heating (IH) system. The heat unit 29*a* may include a plurality of heaters. The fixing device 29 conveys the sheet subjected to the fixing process to the paper discharge unit or the ADU.

The operation panel 4 is a user interface for a user of the image forming apparatus 100. The operation panel 4 includes various buttons and a display unit 4*a* including a touch panel 4*b*. The system control unit 5 (or control system, or controller) controls content displayed on the display unit 4*a* of the operation panel 4. The display unit 4*a* functions as a notification unit. The operation panel 4 outputs information input to the touch panel 4*b* of the display unit 4*a* or the buttons to the system control unit 5. The user designates an operation mode in the operation panel 4 or inputs information such as setting information.

Next, a configuration of the exposure unit 26 will be described.

Figure 3:
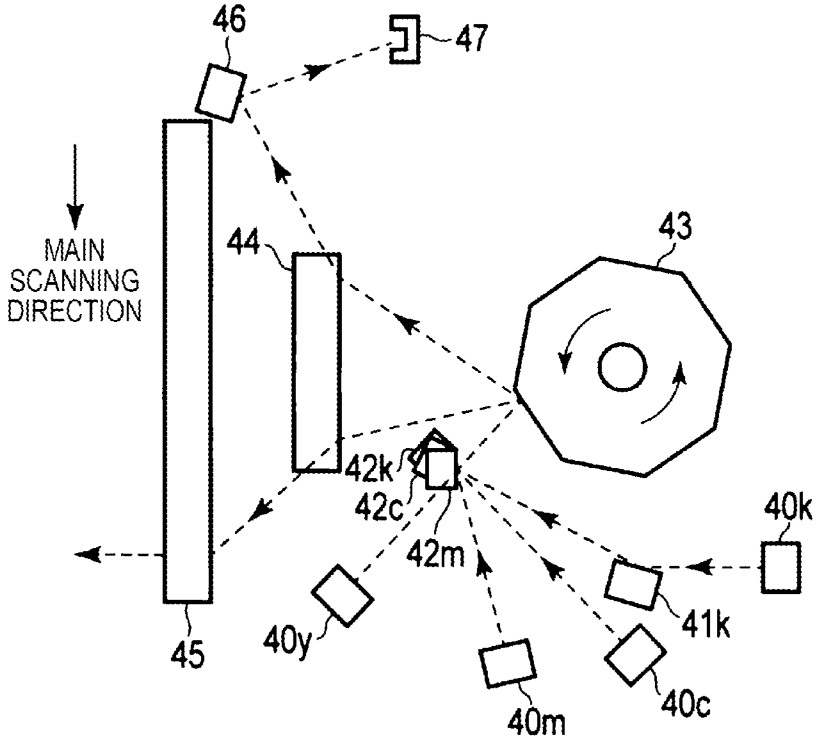
FIG. 3 is a diagram illustrating a configuration example of an exposure unit used in the image forming apparatus.
Figure 4:
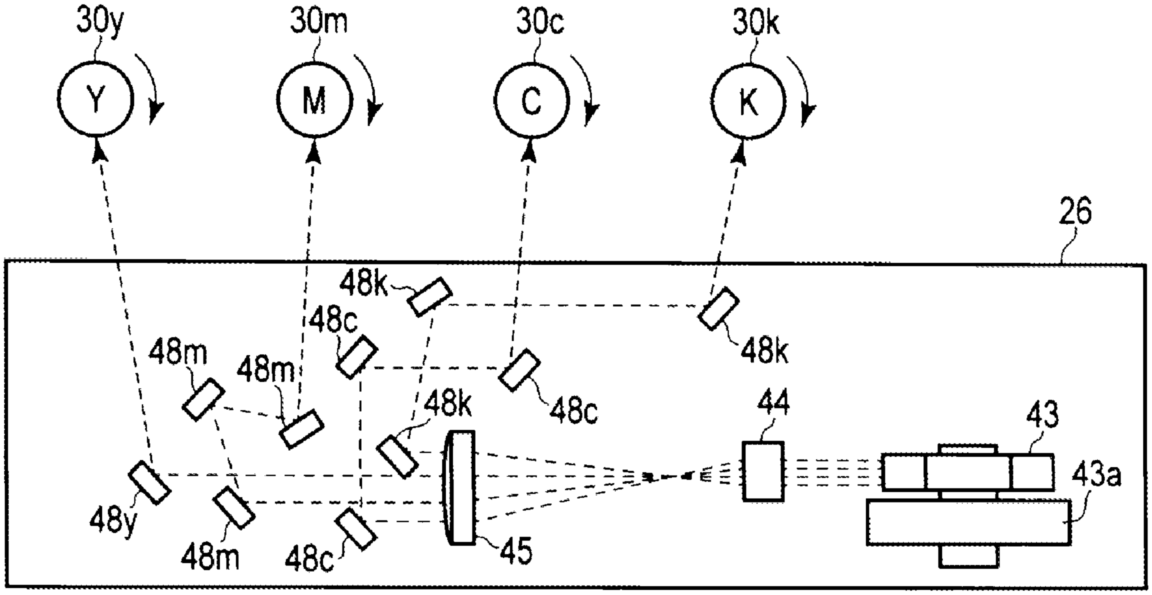
FIG. 4 is a sectional view illustrating a configuration example of the exposure unit.

FIG. 3 is a diagram illustrating a configuration example of the exposure unit 26 used in the image forming apparatus 100. FIG. 4 is a sectional view illustrating a configuration example of the exposure unit 26 provided in the image forming apparatus 100.

The exposure unit 26 illustrated in FIGS. 3 and 4 includes exposure units of each color that forms an image. In the image forming apparatus 100 that forms a color image, as illustrated in FIG. 2, the exposure unit 26 includes exposure units of each color that forms a color image. In an image forming apparatus that forms only a monochromic image, the exposure unit 26 may include one set of exposure unit that forms a monochromic image.

The exposure unit 26 illustrated in FIGS. 3 and 4 includes a beam detect (BD) detection unit and exposure units for each color, that is, yellow, magenta, cyan, and black. The exposure units for each color respectively include a laser unit 40 (40*y*, 40*m*, 40*c*, and 40*k*) and an optical system. Each laser unit 40 includes a plurality of light-emitting elements (e.g., laser diodes, light-emitting diodes (LEDs), or other semiconductor devices that produce light when current flows through them). For example, each laser unit 40 is configured by a laser array in which a plurality of laser diodes (LDs) are arrayed. The optical system included in the exposure units for each color includes a mirror 41*k*, mirrors 42 (42*m*, 42*c*, and 42*k*), a polygon mirror 43, lens 44 and 45, mirror groups 48 (48*y*, 48*m*, 48*c*, and 48*k*), and the like.

The exposure unit for yellow includes the laser unit 40*y*, the polygon mirror 43, the lenses 44 and 45, and the mirror group 48*y*. The laser unit 40*y* emits laser light for forming a yellow image. The polygon mirror 43, the lenses 44 and 45, the mirror group 48*y* are an optical system for guiding the laser light emitted by the laser unit 40*y* to the photoreceptor drum 30*y*. The polygon mirror 43 is rotated by a polygon mirror motor 43*a*. The polygon mirror 43 is rotated to scan the laser light on the photoreceptor drum 30*y* in a main scanning direction. The main scanning direction is a direction of the rotational shaft of the photoreceptor drum 30*y*. A scanning position of the laser light emitted by the laser unit 40*y* is moved in a sub-scanning direction on the photoreceptor drum 30*y* by the rotated polygon mirror 43. The sub-scanning direction is a direction orthogonal to the main scanning direction.

The exposure unit for magenta includes the laser unit 40*m*, the mirror 42*m*, the polygon mirror 43, the lenses 44 and 45, and the mirror group 48*m*. The laser unit 40*m* emits laser light for forming a magenta image. The polygon mirror 43, the lenses 44 and 45, the mirror group 48*m* are an optical system for guiding the laser light emitted by the laser unit 40*m* to the photoreceptor drum 30*m*. The polygon mirror 43 is rotated to scan the laser light on the photoreceptor drum 30*m* in the main scanning direction. The main scanning direction is a direction of the rotational shaft of the photoreceptor drum 30*m*. A scanning position of the laser light emitted by the laser unit 40*m* is moved in the sub-scanning direction on the photoreceptor drum 30*m* by the rotated polygon mirror 43.

The exposure unit for cyan includes the laser unit 40*c*, the mirror 42*c*, the polygon mirror 43, the lenses 44 and 45, and the mirror group 48*c*. The laser unit 40*c* emits laser light for forming a cyan image. The polygon mirror 43, the lenses 44 and 45, the mirror group 48*c* are an optical system for guiding the laser light emitted by the laser unit 40*c* to the photoreceptor drum 30*c*. The polygon mirror 43 is rotated to scan the laser light on the photoreceptor drum 30*c* in the main scanning direction. The main scanning direction is a direction of the rotational shaft of the photoreceptor drum 30*c*. A scanning position of the laser light emitted by the laser unit 40*c* is moved in the sub-scanning direction on the photoreceptor drum 30*c* by the rotated polygon mirror 43.

The exposure unit for black includes the laser unit 40*k*, the mirrors 41*k* and 42*k*, the polygon mirror 43, the lenses 44 and 45, and the mirror group 48*k*. The laser unit 40*k* emits laser light for forming a black image. The polygon mirror 43, the lenses 44 and 45, the mirror group 48*k* are an optical system for guiding the laser light emitted by the laser unit 40*k* to the photoreceptor drum 30*k*. The polygon mirror 43 is rotated to scan the laser light on the photoreceptor drum 30*k* in the main scanning direction. The main scanning direction is a direction of the rotational shaft of the photoreceptor drum 30*k*. A scanning position of the laser light emitted by the laser unit 40*k* is moved in the sub-scanning direction on the photoreceptor drum 30*k* by the rotated polygon mirror 43.

The BD detection unit of the exposure unit 26 includes a mirror 46 and a BD sensor 47. The mirror 46 guides the laser light scanned by the polygon mirror 43 toward the BD sensor 47. The BD sensor 47 detects the laser light from one light source of one of the laser units 40. The BD sensor 47 detects the laser light as a signal (a BD signal and a reference signal) serving as a reference of scanning in the main scanning direction. The BD sensor 47 is set on a scanning line on which the laser light from an LD (reference light-emitting element) to be detected is scanned. That is, the BD sensor 47 detects that the laser light is at the reference position in the main scanning direction. In the LD of each laser unit 40, emission of the laser light is controlled using the BD signal detected by the BD sensor 47 as a reference.

Next, a configuration of a control system of the image forming apparatus 100 will be described.

Figure 5:
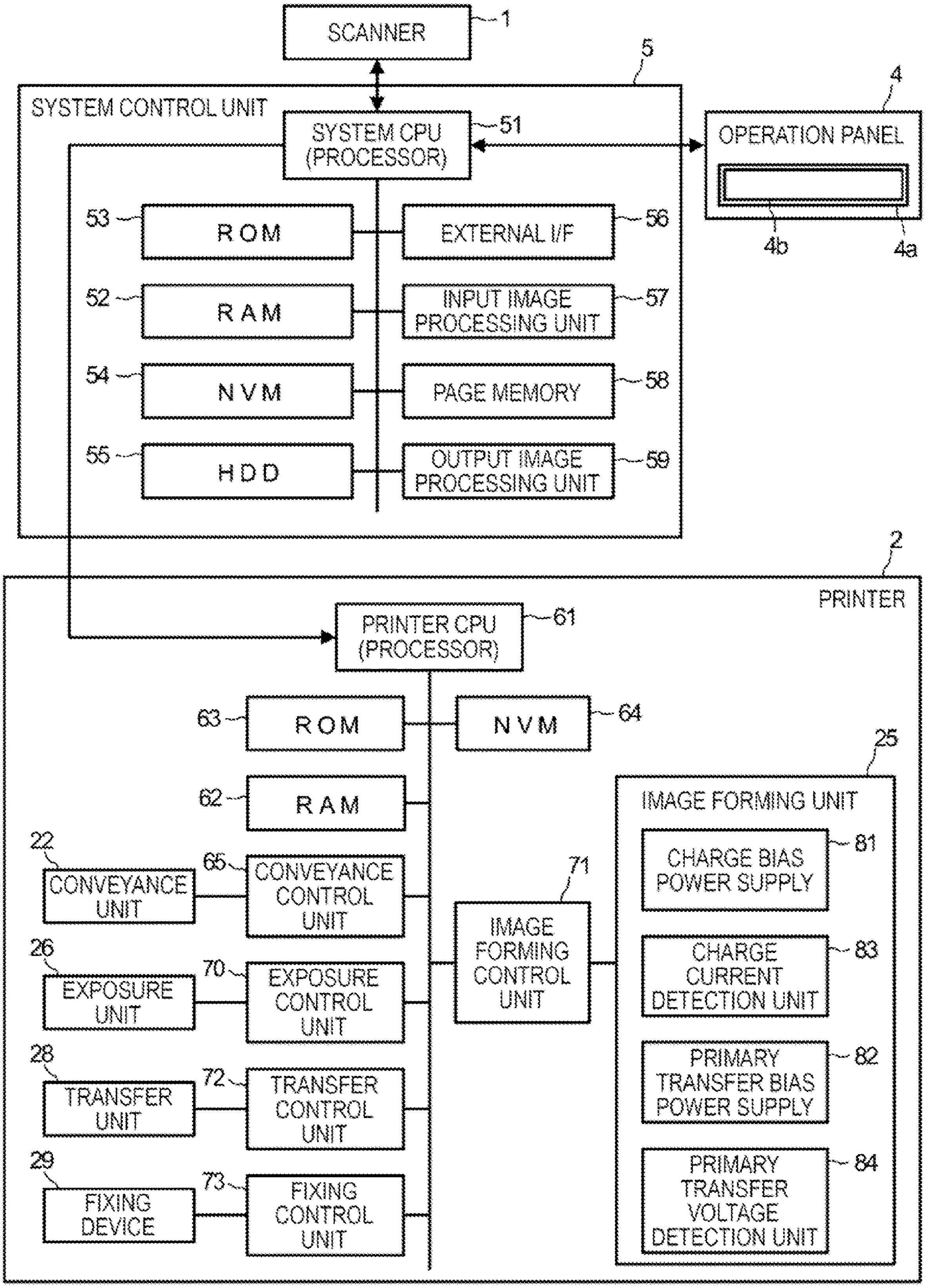
FIG. 5 is a block diagram illustrating a configuration example of a control system in the image forming apparatus.

FIG. 5 is a block diagram schematically illustrating a configuration example of a control system (e.g., a network of components, including a central processing unit (CPU), that manages operations and communications within a device, such as an image forming apparatus) of the system control unit 5 and the printer 2 of the image forming apparatus 100.

In the configuration example, the system control unit 5 includes a system central processing unit (CPU) 51 which is a processer, a random access memory (RAM) 52, a read-only memory (ROM) 53, a nonvolatile memory (referred to as a nonvolatile memory (NVM) in the drawing) 54, a hard disk drive (HDD) 55, an external interface (referred to as an I/F in the drawing) 56, an input image processing unit 57, a page memory 58, and an output image processing unit 59.

The system CPU 51 is a control unit that generally controls each unit (e.g., each component, each subsystem) of the image forming apparatus 100. The system CPU 51 is a processor that performs a process by executing a program. The system CPU 51 is connected to each unit inside the system control unit 5 via a system bus. The system CPU 51 is also connected to the scanner 1, the printer 2, the operation panel 4, and the like via the system bus. The system CPU 51 outputs an operation instruction to each unit or acquires various types of information from each unit through bi-directional communication with the scanner 1, the printer 2, and the operation panel 4.

A CPU that is a processor configuring the control unit may have multi-cores/multi-threads and can perform a plurality of processes concurrently. The processor is not limited to the CPU and may be a micro processing unit (MPU). The processor may be implemented in any of various formats, including integrated circuits such as an application specific integrated circuit (ASIC), a graphics processing unit (GPU), a field-programmable gate array (FPGA), a digital signal processor (DSP), a system on a chip (SoC), and a programmable logic device (PLD). The processor may be a combination of a plurality of integrated circuits.

The RAM 52 is configured with a volatile memory. The RAM 52 functions as a working memory or a buffer memory. The ROM 53 is a nonvolatile memory that cannot be rewritten and stores a program, control data, and the like. The system CPU 51 implements various processes by executing programs stored in the ROM 53 (or the nonvolatile memory 54 or the HDD 55) while using the RAM 52. For example, the system CPU 51 implements a function of giving an instruction to perform printing or a function of prohibiting printing by executing a program.

The nonvolatile memory 54 is a nonvolatile memory that can be rewritten. The nonvolatile memory 54 stores a control program executed by the system CPU 51 and control data. The nonvolatile memory 54 stores various types of setting information, processing conditions, and the like. For example, the nonvolatile memory 54 stores setting information regarding each paper feed cassette (paper feed unit).

The HDD 55 is a large capacity storage device (e.g., solid state drive (SSD), network attached storage (NAS), optical disc archive (ODA), cloud storage services). The HDD 55 stores image data, various types of operation history information, and the like. The HDD 55 may store a control program, control data, and the like. The HDD 55 may store setting information, processing conditions, and the like.

The external interface 56 is an interface (e.g., USB, ethernet port, Wi-Fi adapter, application programming interface (API)) for communication with an external apparatus. For example, the external interface 56 receives a printing job from the user terminal 200 which is an external apparatus or transmits data to the server apparatus 300 which is an external apparatus. The external interface 56 can be any interface as long as the interface performs data communication with an external apparatus.

The input image processing unit 57 performs image processing on image data read by the scanner 1. The input image processing unit 57 has, for example, functions such as a shading correction process, a grayscale conversion process, an inter-line correction process, and compression and decompression processes. The input image processing unit 57 stores image data subjected to image processing in the page memory 58.

The page memory 58 is a memory on which image data is loaded. For example, the page memory 58 stores image data obtained by the input image processing unit 57 performing image processing on image data read by the scanner 1. The page memory 58 may store image data included in a printing job acquired by the external interface 56.

The output image processing unit 59 generates printing image data to be printed on a sheet by the printer 2. The output image processing unit 59 performs image processing to convert image data stored in the page memory 58 into printing image data. The output image processing unit 59 transmits the data subjected to the image processing to the printer 2.

Next, a configuration example of a control system in the printer 2 will be described.

In the configuration example illustrated in FIG. 5, the printer 2 includes a printer CPU 61, a RAM 62, a ROM 63, a nonvolatile memory (NVM) 64, a conveyance control unit 65, an exposure control unit 70, an image forming control unit 71, a transfer control unit 72, and a fixing control unit 73 as a configuration of a control system.

The printer CPU 61 is in charge of controlling the entire printer 2. The printer CPU 61 is a processor that implements a process by executing a program. The processor is not limited to the CPU and may be implemented in any of different various format, including integrated circuits such as MPU, ASIC, GPU, FPGA, DSP, SoC, and PLD. The processor may be a combination of the plurality of integrated circuits. The printer CPU 61 is connected to each unit inside the printer 2 via a system bus or the like. The printer CPU 61 outputs an operation instruction (e.g., command) to each unit inside the printer 2 in response to an operation instruction from the system CPU 51. The printer CPU 61 notifies the system CPU 51 of information indicating a processing status in the printer 2.

The RAM 62 is configured with a volatile memory. The RAM 62 functions as a working memory or a buffer memory. The ROM 63 is a nonvolatile memory that cannot be rewritten and stores a program, control data, and the like. The printer CPU 61 implements various processes by executing programs stored in the ROM 63 (or the nonvolatile memory 64) while using the RAM 62.

Figure 6:
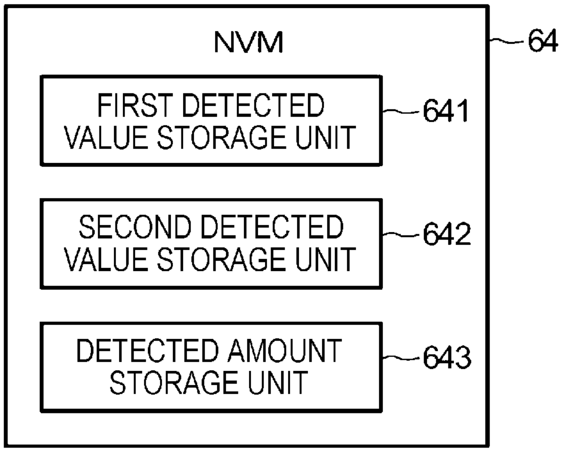
FIG. 6 is a block diagram illustrating a configuration example of a nonvolatile memory of a printer in the image forming apparatus.

The nonvolatile memory 64 is a nonvolatile memory that can be rewritten. For example, the nonvolatile memory 64 stores a control program executed by the printer CPU 61, control data, and history data generated by executing a control program by the printer CPU 61. The nonvolatile memory 64 may store setting information, processing conditions, and the like. FIG. 6 is a block diagram illustrating a configuration example of the nonvolatile memory 64. In the embodiment, the nonvolatile memory 64 can include, for example, a first detected value storage unit 641, a second detected value storage unit 642, and a detected amount storage unit 643. The details of the first detected value storage unit 641, the second detected value storage unit 642, and the detected amount storage unit 643 will be described below.

The conveyance control unit 65 (or conveyance control system) controls conveyance of a sheet (e.g., paper) inside the printer 2. The conveyance control unit 65 controls driving of the pickup rollers 21, the conveyance rollers 22A, 22B, and 22C of the conveyance unit 22, or the like. The conveyance control unit 65 controls driving of the conveyance rollers 22A, 22B, and 22C as the conveyance units 22 in the printer 2 in response to an operation instruction from the printer CPU 61. For example, the printer CPU 61 gives an instruction to control conveyance of a sheet to the conveyance control unit 65 in response to an instruction to start printing from the system control unit 5.

The exposure control unit 70 (or exposure control system) controls the exposure unit 26 (or exposure system). The exposure control unit 70 forms electrostatic latent images on the photoreceptor drum 30 (30*y*, 30*m*, 30*c*, and 30*k*) of each image forming unit 25 (25Y, 25M, 25C, and 25K) by the exposure unit 26 in response to an operation instruction from the printer CPU 61. For example, the exposure control unit 70 controls the laser light with which the exposure unit 26 irradiates each photoreceptor drum 30 according to the image data of which an instruction from the printer CPU 61 is given to perform printing. For example, the exposure control unit 70 controls scanning of the laser light emitted by each laser unit using the BD signal acquired from the exposure unit 26 as a reference.

The image forming control unit 71 (or image forming control system) controls driving of each image forming unit 25 (25Y, 25M, 25C, and 25K) (or image forming system) in response to an operation instruction from the printer CPU 61. For example, the image forming control unit 71 controls a charge bias power supply 81 included in the image forming unit 25 to charge the photoreceptor drum 30 by the charge roller 31 with a predetermined potential. The charge bias power supply 81 is, for example, a high-voltage power supply using a constant voltage transformer. The charge bias power supply 81 applies a voltage in which an alternating-current voltage is superimposed on a direct-current voltage to the charge roller 31 under the control of the printer CPU 61. The charge roller 31 charges the photoreceptor drum 30 through charging by applying the voltage. The image forming control unit 71 develops the electrostatic latent image formed on the photoreceptor drum 30 after the charging process into the toner image of each color by the developing unit 32. The image forming control unit 71 controls density of the toner to be developed by controlling a development bias or the like of the developing unit 32. The image forming control unit 71 transfers the toner image developed on the photoreceptor drum 30 to the transfer belt 27 by the primary transfer roller 33 by controlling a primary transfer bias power supply 82 included in the image forming unit 25. The primary transfer bias power supply 82 is, for example, a high-voltage power supply using a constant current transformer. The primary transfer bias power supply 82 draws the toner on the surface of the photoreceptor drum 30 and transfers the toner image formed on the photoreceptor drum 30 to the transfer belt 27 by applying the voltage subjected to constant current control to the primary transfer roller 33 under the control of the printer CPU 61. The image forming control unit 71 cleans the surface of the photoreceptor drum 30 after the transferring process by the photoreceptor cleaner 34.

If the voltage in which the alternating-current voltage is superimposed on the direct-current voltage is applied to the charge roller 31, a charge potential of the surface of the photoreceptor drum 30 (hereinafter abbreviated to a surface potential) is converged near the direct-current voltage. Therefore, it is generally known that an alternating-current peak voltage which is a peak value of the alternating-current voltage applied to the charge roller 31 is set to be twice or more a direct-current discharge start voltage. On the other hand, if the alternating-current peak voltage is increased, a discharge amount increases, an ozone density near the photoreceptor drum 30 increases according to an increase of the discharge amount, and deterioration in the photoreceptor drum 30 may be accelerated. Therefore, the number of printing endurable sheets is known to considerably decrease. To solve the problem, it is desirable to set the alternating-current peak voltage to a vicinity of saturation (e.g., threshold of saturation) start of the surface potential of the photoreceptor drum 30. Various methods are proposed as a control method of setting the alternating-current voltage to a vicinity of saturation start of the surface potential of the photoreceptor drum 30. For example, a method is known in which a direct current or an alternating current flowing from the charge bias power supply 81 which is a high-voltage power supply to the charge roller 31 is measured, the measured current is compared to a direct-current or an alternating-current reference value estimated to be near the saturation start of the surface potential of the photoreceptor drum 30, and a voltage applied to the charge roller 31 is varied to match a current reference value. To perform the control of the alternating-current peak voltage, the image forming unit 25 includes a charge current detection unit 83.

To prevent image noise in the image forming apparatus 100, it is necessary to set a primary transfer voltage value appropriate for the primary transfer roller 33. Therefore, a method of detecting an application voltage when outputting a constant current to the primary transfer roller 33 and setting a primary transfer voltage value when forming an image on the primary transfer roller 33 based on the detected voltage is known as a control method. To perform the setting control of the primary transfer voltage value, the image forming unit 25 includes a primary transfer voltage detection unit 84. For example, if an image forming operation is started, the image forming control unit 71 controls the primary transfer bias power supply 82 and outputs a current subjected to a constant current control to the primary transfer rollers 33. The primary transfer voltage detection unit 84 detects an application voltage to the primary transfer rollers 33 subjected to the constant current control.

The image forming control unit 71 controls the charge bias power supply 81 of the image forming unit 25 to diagnose damage of the photoreceptor drum 30 and applies a predetermined detection voltage to the charge roller 31 during a defined period. The charge current detection unit 83 detects a current flowing in the charge roller 31 a plurality of times within the defined period. The charge bias power supply 81 and the charge current detection unit 83 are a first detected value acquisition unit (or first detected value acquisition system) that applies a voltage to the charge roller 31 for a first defined period (e.g., specified interval) and detects a first detected value (e.g., measured value) which is a detected value of a current a plurality of times. The image forming control unit 71 controls the primary transfer bias power supply 82 such that a predetermined detection current is applied to the primary transfer rollers 33 during a defined period, and the primary transfer voltage detection unit 84 detects a voltage within the defined period a plurality of times. The primary transfer bias power supply 82 and the primary transfer voltage detection unit 84 are a second detected value acquisition unit (or second detected value acquisition system) that applies a current to the primary transfer rollers 33 for a second defined period and detects a second detected value which is a detected value of a voltage a plurality of times. The first and second defined periods are preferably the same time period. The number of times a current value is detected and the number of times a voltage value is detected may be the same as each other or may be different from each other.

The transfer control unit 72 (or transfer control system) controls driving, a transfer current, and the like of the transfer unit 28 (or transfer system). The transfer control unit 72 causes the transfer unit 28 to transfer a toner image transferred to the transfer belt 27 to a sheet in response to an operation instruction from the printer CPU 61.

The fixing control unit 73 (or fixing control system) controls driving of the fixing device 29. The fixing control unit 73 drives the heat roller 29*b* and the pressure roller 29*c* in response to an operation instruction from the printer CPU 61. The fixing control unit 73 controls the surface temperature of the heat roller 29*b* to a fixing temperature by controlling the heat unit 29*a* (or heating system).

Next, a damage diagnosis method of the photoreceptor drum 30 will be described.

Figure 7:
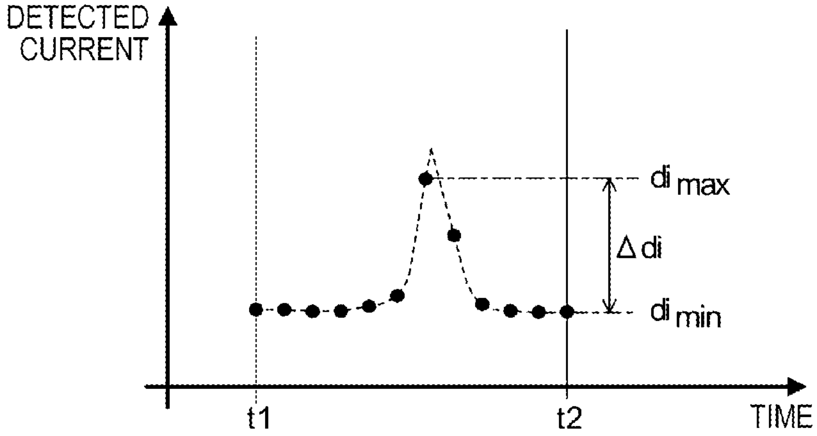
FIG. 7 is a graph illustrating a change in a detected current value if there is damage in a photoreceptor.

FIG. 7 is a graph illustrating a change in a detected current value if there is damage in the photoreceptor drum 30. The printer CPU 61 controls the image forming control unit 71 to apply a predetermined charge roller detection voltage from the charge bias power supply 81 to the charge roller 31 for a defined period, for example, from time t1 to t2, and detects a current by the charge current detection unit 83 a plurality of times, for example, twelve times in the example of FIG. 7, during the defined period. In a portion in which there is damage such as a flaw or a fracture on the surface of the photoreceptor drum 30, electric load resistance decreases including a photosensitive layer of the photoreceptor drum 30 and the charge roller 31. Therefore, a detected current value di detected in the damaged portion in which there is a flaw or a fracture increases locally, as indicated by a broken line in FIG. 7. Accordingly, the printer CPU 61 calculates a difference between a maximum value $di_{max}$ and a minimum value $di_{min}$ (or the difference between a plurality of maximum and minimum values) of the detected current value di detected by sampling a plurality of times during the defined period as one detected amount Δdi (e.g., the change or variation in the detected current value). The printer CPU 61 can determine that there is abnormality (e.g., one or more abnormalities, a plurality of abnormalities, at least one abnormality) on the photoreceptor drum 30 if the detected amount Δdi exceeds a predetermined current threshold. The printer CPU 61 is a first abnormality detection unit (or first abnormality detection system) that detects abnormality depending on whether the difference between the maximum value and the minimum value of the first detected value detected during the first defined period exceeds the first threshold. Here, there is a possibility that a large, detected amount Δdi is detected due to an influence of noise or the like occurred accidentally, and there is no damage actually. To exclude a possibility of the erroneous determination, the printer CPU 61 does not confirm that there is damage such as a flaw or a fracture (e.g., defect) in the photoreceptor drum 30 only with the detection of abnormality at the charge position, and adds a determination result of the detection of abnormality of the photoreceptor drum 30 at the primary transfer position.

Figure 8:
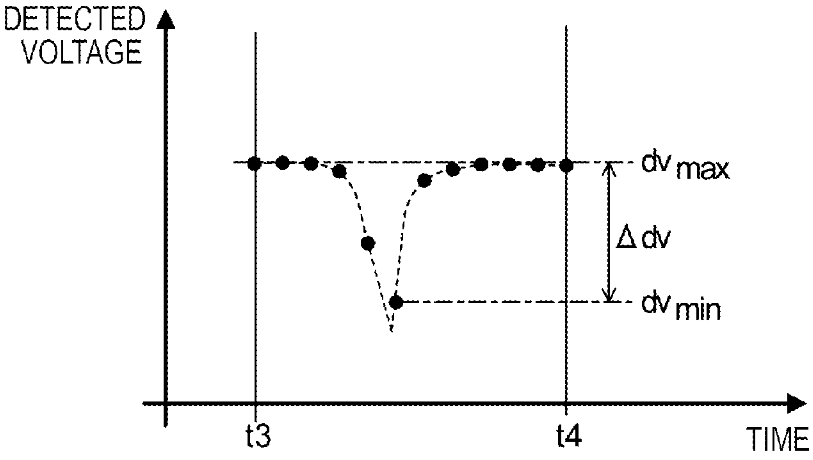
FIG. 8 is a graph illustrating a change in a detected voltage value if there is damage in the photoreceptor.

FIG. 8 is a graph illustrating a change in a detected voltage value if there is damage in the photoreceptor. In detection of abnormality at the primary transfer position, the printer CPU 61 controls the image forming control unit 71 to apply a predetermined primary transfer roller detection current (e.g., set current for checking the transfer roller) from the primary transfer bias power supply 82 to the primary transfer rollers 33 during a defined period, for example, from time t3 to t4, and detects a voltage by the primary transfer voltage detection unit 84 a plurality of times, for example, twelve times in the example of FIG. 7, during the defined period. In a portion in which there is damage such as a flaw or a fracture on the surface of the photoreceptor drum 30, electric load resistance of the primary transfer unit decreases locally. Therefore, a detected voltage value dv detected in a damaged portion in which there is a flaw or a fracture decreases locally, as indicated by a broken line in FIG. 8, in a situation where a constant current is applied. Accordingly, the printer CPU 61 calculates a difference between a maximum value $dv_{max}$ and a minimum value $dv_{min}$ of the detected current value dv detected by sampling a plurality of times during a defined period as one detected amount Δdv (e.g., the change or variation in the detected voltage value) similarly to the detection at the position of the charge roller 31. If the detected amount Δdv exceeds a predetermined voltage threshold, the printer CPU 61 can determine that there is abnormality in the photoreceptor drum 30 even in abnormality detection at the primary transfer position. The printer CPU 61 is a second abnormality detection unit (or second abnormality detection system) that detects abnormality depending on whether a difference between a maximum value and a minimum value (e.g., different than the maximum and minimum value of the first detected value associated with the first threshold, the same maximum and minimum value of the first detected value associated with the first threshold) of the second detected value detected during the second defined period exceeds a second threshold.

Figure 9:
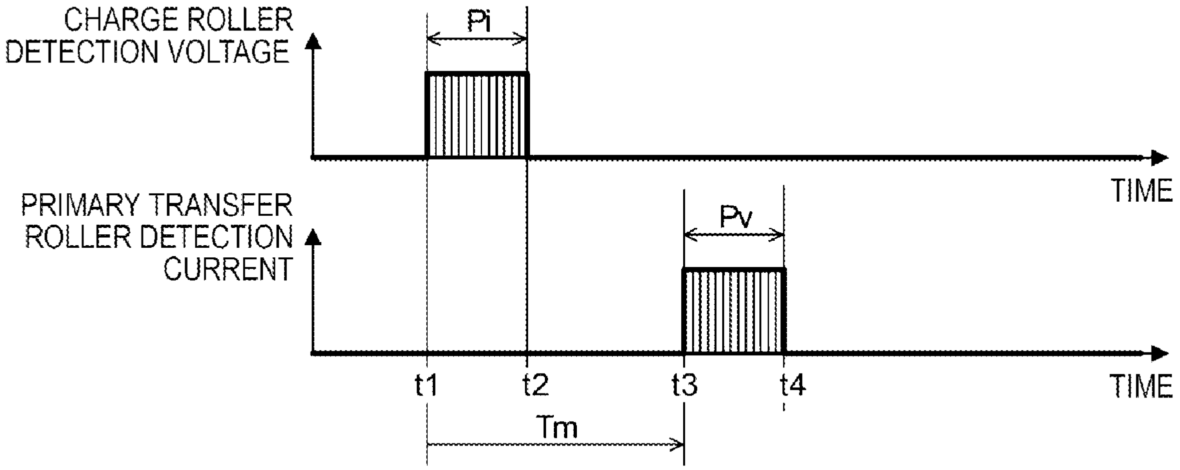
FIG. 9 is a timing chart illustrating a deviation between detection timings of two portions.
Figure 10:
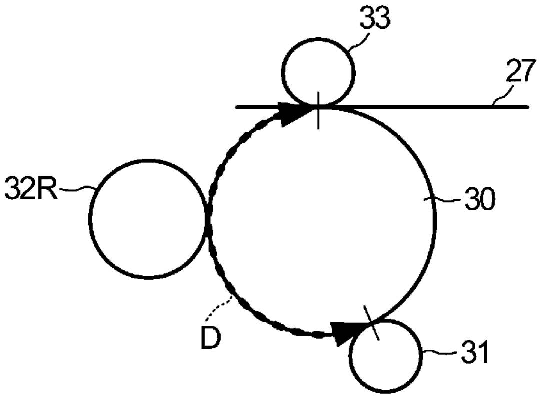
FIG. 10 is a schematic diagram illustrating a distance between detection positions of the two portions.

FIG. 9 is a timing chart (e.g., sequence diagram) illustrating a deviation (e.g., offset) between detection timings of two portions. FIG. 10 is a schematic diagram illustrating a distance between detection positions of two portions. By detecting abnormality again at the primary transfer position in the same portion as the surface of the photoreceptor drum 30 in which abnormality is detected at the position of the charge roller 31, it is possible to improve reliability of diagnosis of damage such as a flaw or a fracture (e.g., defect). Therefore, the detection of abnormality of the photoreceptor drum 30 at the primary transfer position starts at a time point at which a defined time Tm, regulated as a time necessary for the surface of the photoreceptor drum 30 to move by a distance D between a charge roller position and the primary transfer position, passed from a timing at which the detection of abnormality of the photoreceptor drum 30 at the position of the charge roller 31 starts as described above. Reference numeral 32R in FIG. 10 denotes a developing roller of the developing unit 32.

For example, the printer CPU 61 is assumed to apply a charge roller detection voltage from the charge bias power supply 81 to the charge roller 31 for a defined period from time t1 to t2. The printer CPU 61 sets the defined period as a charge current detection period Pi, detects a current value by the charge current detection unit 83 a plurality of times during the charge current detection period Pi, and stores the detected current value in the first detected value storage unit 641 of the nonvolatile memory 64. Then, based on the plurality of detected current values stored in the first detected value storage unit 641, the printer CPU 61 determines whether there is abnormality in the photoreceptor drum 30 at the position of the charge roller 31 (e.g., correlates). On the other hand, if the primary transfer roller detection current is applied from the primary transfer bias power supply 82 to the primary transfer roller 33, the printer CPU 61 waits the application until a time t3 comes at which the defined time Tm passed from a certain time t1 which is a start time point of the charge current detection period Pi. If the time t3 comes, the printer CPU 61 applies the primary transfer roller detection current from the primary transfer bias power supply 82 to the primary transfer rollers 33 during the defined period from time t3 to t4. The printer CPU 61 sets the defined period as a primary transfer voltage detection period Pv, detects a voltage value by the primary transfer voltage detection unit 84 a plurality of times during the primary transfer voltage detection period Pv, and stores the detected voltage value in the second detected value storage unit 842 of the nonvolatile memory 64. The printer CPU 61 determines whether there is abnormality of the photoreceptor drum 30 at the primary transfer position based on a plurality of detected voltage values stored in the second detected value storage unit 642. The printer CPU 61 is a control unit (or control system) that causes the second detection unit (or second detection system or sensor) to start detecting abnormality at a time point at which a waiting time, which is the defined time Tm necessary for the photoreceptor drum 30 to rotate by a distance between the first and second positions, passed from the start of the detection of abnormality by the first detection unit (or first detection system or sensor).

If the printer CPU 61 determines that there is abnormality in both the detection of abnormality of the photoreceptor drum 30 at the position of the charge roller 31 and the detection of abnormality of the photoreceptor drum 30 at the primary transfer position, the printer CPU 61 determines that there is a high possibility of damage such as a flaw or a fracture on the photoreceptor drum 30. The printer CPU 61 is a determination unit (or determination system) that determines that damage occurred at the surface position of the photoreceptor drum 30 if the second detection unit also detects that there is abnormality at the surface position of the photoreceptor drum 30 at which the first detection unit detected abnormality. As such, if abnormality such as a flaw is detected at each of different positions, a risk of erroneous diagnosis of damage can be reduced.

The method of diagnosing damage such as a flaw or a fracture at a certain portion of the photoreceptor drum 30 was described above. If the above-described damage diagnosis of the photoreceptor drum 30 is repeated at predetermined time intervals, it is possible to verify whether there is damage such as a flaw on the entire circumference of the photoreceptor drum 30.

Figure 11:
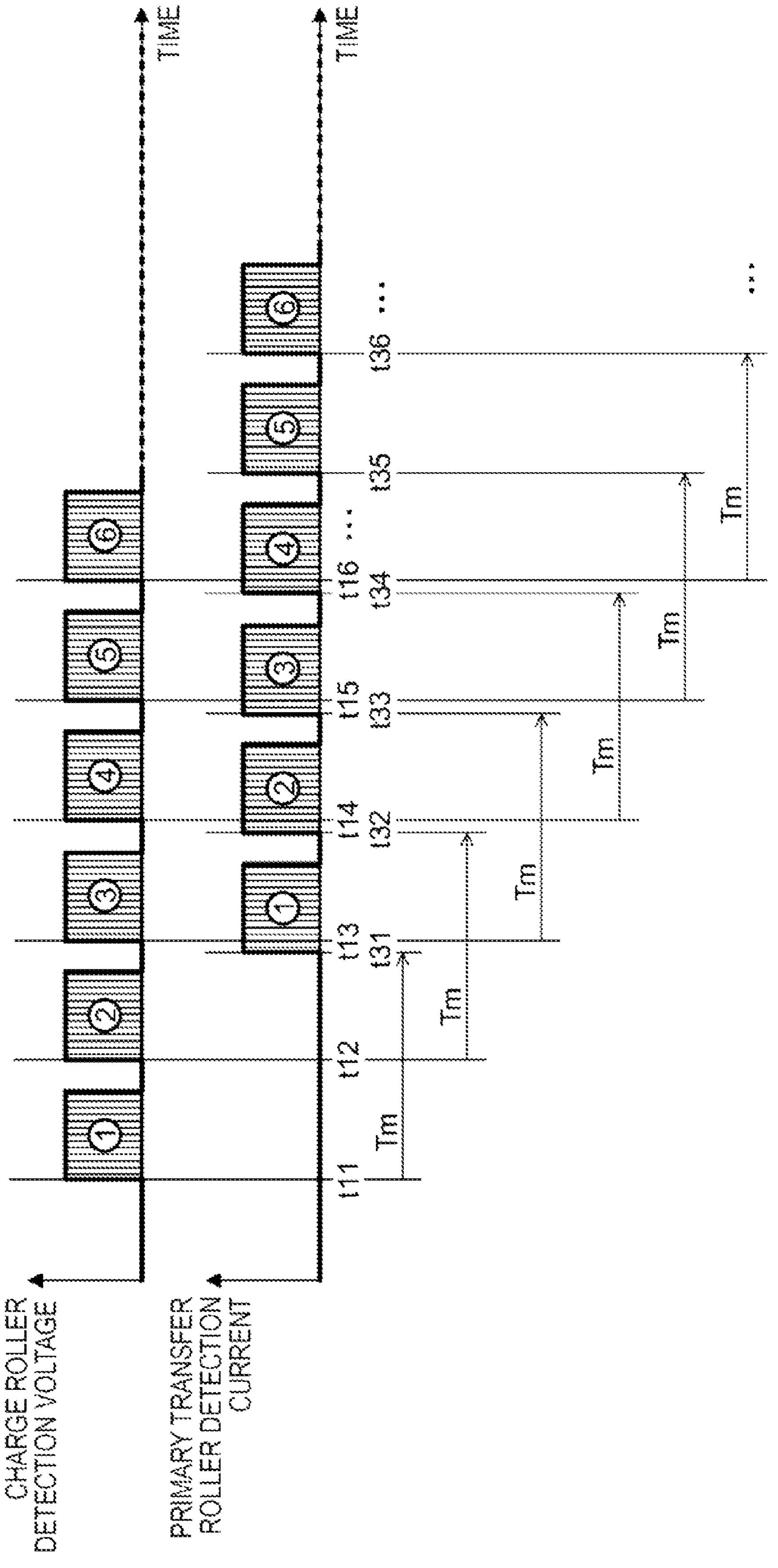
FIG. 11 is a timing chart illustrating repeated detection in an image forming apparatus of an image forming system according to a first embodiment.

FIG. 11 is a timing chart illustrating the repeated detection. As illustrated in FIG. 11, a charge roller detection voltage is applied during each defined period at times t11, t12, t13, t14, t15, t16, tn as application start timings. Each defined period is set as the charge current detection period Pi, a charge current is detected during each period a plurality of times, and the detected value is stored in the first detected value storage unit 641 included in the nonvolatile memory 64. FIG. 12 is a diagram illustrating an example of storage content of the first detected value storage unit 641. The first detected value storage unit 641 stores a detected current value di of charge currents n times acquired during the charge current detection period Pi in association with a period identifier (ID) (e.g., interval identifier, cycle tag) for specifying each charge current detection period Pi. The first detected value storage unit 641 is a first memory that stores the detected current value di of the charge current.

The primary transfer roller detection current is applied during each defined period at each of times t31, t32, t33, t34, t35, t36, tn as application start timings at which the defined time Tm passed from timings of the times t11, t12, t13, t14, t15, t16, tn. Each defined period is set as the primary transfer voltage detection period Pv, the primary transfer voltage is detected a plurality of times during each period, and the detected value is stored in the second detected value storage unit 642 included in the nonvolatile memory 64. The second detected value storage unit 642 has a storage format similar to that of the first detected value storage unit 641, as indicated by parentheses in FIG. 12. That is, the second detected value storage unit 642 stores the detected voltage value dv of the primary transfer voltage n times acquired during the primary transfer voltage detection period Pv in association with a period ID for specifying each primary transfer voltage detection period Pv. The second detected value storage unit 642 is a second memory that stores the detected voltage value dv of the primary transfer voltage.

The printer CPU 61 calculates (e.g., determines, computationally computes, generates) a difference between a maximum value $di_{max}$ and a minimum value $di_{min}$ for each detected current value di of the charge current n times acquired during each charge current detection period Pi stored in the first detected value storage unit 641 and stores the difference as a detected amount Δdi in each charge current detection period Pi in the detected amount storage unit 643 included in the nonvolatile memory 64. Similarly, the printer CPU 61 calculates a difference between a maximum value $dv_{max}$ and a minimum value $dv_{min}$ at each detected voltage value dv of the primary transfer voltage n times acquired during each primary transfer voltage detection period Pv stored in the second detected value storage unit 642 and stores the difference as a detected amount Δdv in each primary transfer voltage detection period Pv in the detected amount storage unit 643. FIG. 13 is a diagram illustrating an example of storage content of the detected amount storage unit 643. The detected amount storage unit 643 stores a value of a detected amount in each period in association with a detected amount ID for distinguishing the detected amount Δdi from the detected amount Δdv. If there is a period in which both the detected amounts stored in the detected amount storage unit 643 exceed corresponding current or voltage thresholds, the printer CPU 61 can determine that there is damage at the surface position of the photoreceptor drum 30 corresponding to the period.

As described above, since the charge current detection period Pi which is the first defined period and the primary transfer voltage detection period Pv which is the second defined period are shorter than a time in which the photoreceptor drum 30 is rotated once (e.g., shorter than one rotation, less than a full rotation), the periods are repeated at predetermined time intervals. The number of repetitions is at least the number of detecting whether there is abnormality on the entire circumference of the surface of the photoreceptor drum 30 (e.g., periodically scanning sections of the drum until the entire surface is assessed). In FIG. 11, to clarify the application period of each of the charge roller detection voltage and the primary transfer roller detection current, the predetermined time interval which is a non-application section between the adjacent application periods is largely indicated. The predetermined time interval may be a sampling interval or more of the charge current and the primary transfer voltage.

Next, an operation example of the image forming apparatus 100 according to an embodiment will be described.

In the image forming apparatus 100 having such configuration, if power is supplied through an ON operation of a power switch (not illustrated), the system CPU 51 and the printer CPU 61 execute operations according to programs stored in the ROMs 53 and 63 or the nonvolatile memories 54 and 64. For example, the system CPU 51 instructs the printer 2 to perform printing indicated by a printing job in response to reception of the printing job from the user terminal 200 or causes the scanner 1 to scan a document and instructs the printer 2 to print an image of the scanned document in response to a copy instruction from the touch panel 4*b* of the operation panel 4 by a user. The printer CPU 61 of the printer 2 performs printing in response to a printing instruction from the system CPU 51.

The printer CPU 61 performs a problem portion diagnosis operation of each unit of the printer 2 in addition to the normal operation. As a problem portion diagnosis operation, there is a damage diagnosis operation of the photoreceptor drum 30.

Figure 14:
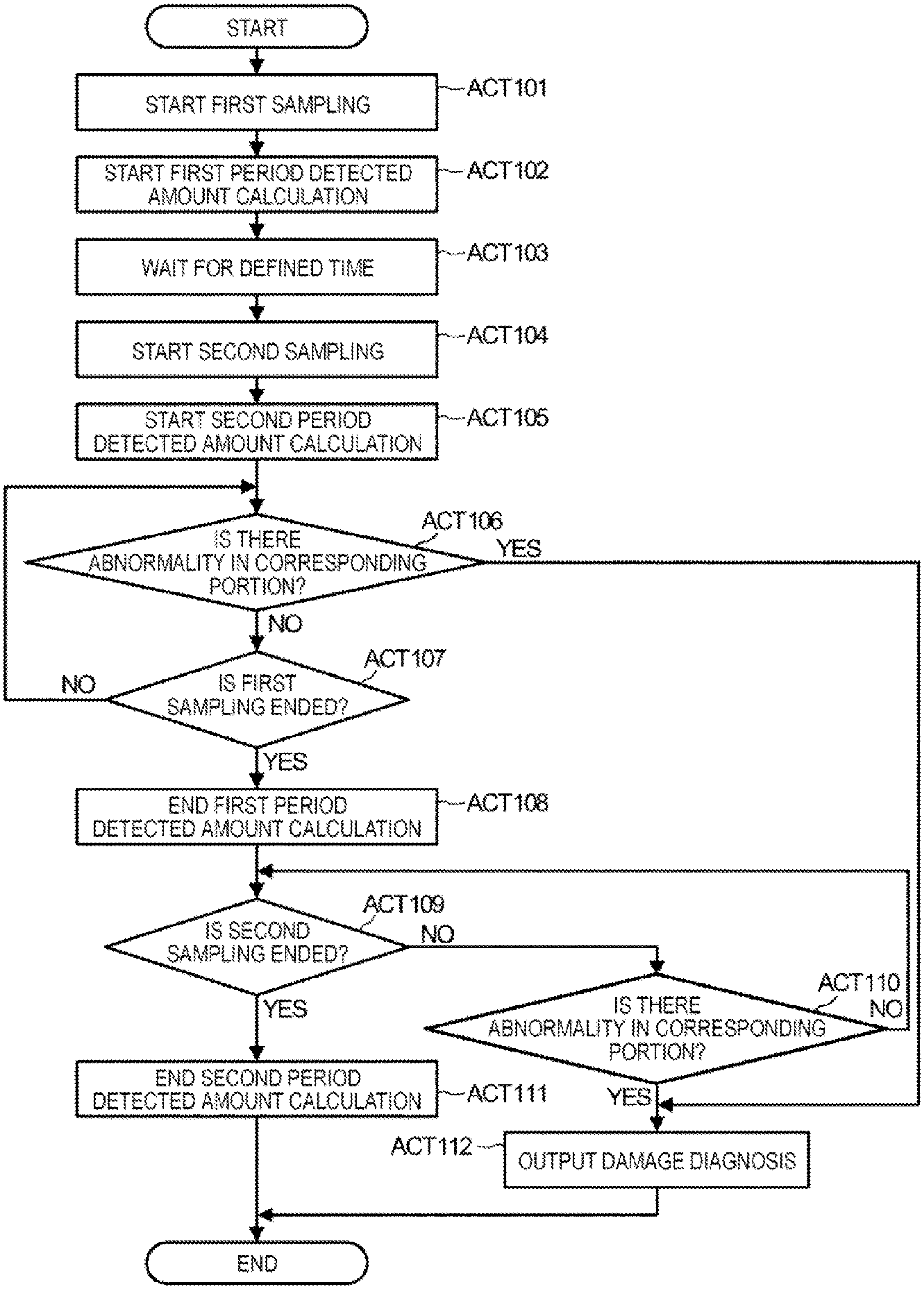
FIG. 14 is a flowchart illustrating an example of a damage diagnosis processing operation by a printer of the image forming apparatus.

FIG. 14 is a flowchart illustrating an example of a damage diagnosis processing operation by the printer 2 of the image forming apparatus 100. Content of a process which is illustrated in FIG. 14 and will be described below is exemplary and any of various processes of obtaining the same result can be appropriately used.

For example, if power is supplied through an ON operation of a power switch, the printer CPU 61 performs a process of the diagnosis operation based on a control program stored in the nonvolatile memory 64. Alternatively, the printer CPU 61 may perform a processing operation illustrated in the flowchart at a time determined in advance by a timer (e.g., scheduler, timekeeper) or the like. The printer CPU 61 can also perform the processing operation illustrated in the flowchart under the control of the system CPU 51 in response to a damage diagnosis instruction from the user on the touch panel 4*b* of the operation panel 4 at any time point. It is assumed that the process of the printer CPU 61 transitions to ACT (n+1) after ACTn (where n is a natural number) unless otherwise mentioned.

In ACT101, the printer CPU 61 starts first sampling. Specifically, the printer CPU 61 controls the image forming control unit 71 such that application of the charge roller detection voltage from the charge bias power supply 81 to the charge roller 31 and a plurality of times of detections of the charge current in the charge current detection unit 83 during the charge current detection period Pi are started repeatedly (or iteratively, e.g., occurring at regularly intervals) at predetermined time intervals. The printer CPU 61 receives the detected current value di of the charge current detected by the charge current detection unit 83 from the image forming control unit 71 and stores the detected current value di in the first detected value storage unit 641 of the nonvolatile memory 64.

In ACT102, the printer CPU 61 starts calculating the first period detected amount. Specifically, the printer CPU 61 starts calculating the detected amount Δdi which is a difference between the maximum value $di_{max}$ and the minimum value $di_{min}$ at the detected current value di of the charge current of the charge current detection period Pi stored in the first detected value storage unit 641. The printer CPU 61 stores the calculated detected amount Δdi in the detected amount storage unit 643 of the nonvolatile memory 64 whenever the calculated detected amount Δdi is calculated.

In ACT103, the printer CPU 61 waits (e.g., pause, delay) during the defined time Tm. That is, the printer CPU 61 performs timing adjustment.

In ACT104, the printer CPU 61 starts second sampling. Specifically, the printer CPU 61 controls the image forming control unit 71 such that application of the primary transfer roller detection current from the primary transfer bias power supply 82 to the primary transfer roller 33 and the plurality of times of detections of the primary transfer voltage in the primary transfer voltage detection unit 84 during the primary transfer voltage detection period Pv are started repeatedly at predetermined time intervals. The printer CPU 61 receives the detected voltage value dv of the primary transfer voltage detected by the primary transfer voltage detection unit 84 from the image forming control unit 71 and stores the detected voltage value dv in the second detected value storage unit 642 of the nonvolatile memory 64.

In ACT105, the printer CPU 61 starts calculating the second period detected amount. Specifically, the printer CPU 61 starts calculating the detected amount Δdv which is a difference between a maximum value $dv_{max}$ and a minimum value $dv_{min}$ at the detected voltage value dv of the primary transfer voltage of the primary transfer voltage detection period Pv stored in the second detected value storage unit 642. The printer CPU 61 stores the calculated detected amount Δdv in the detected amount storage unit 643 of the nonvolatile memory 64 whenever the calculated detected amount Δdv is calculated.

In ACT106, the printer CPU 61 determines whether there is abnormality (or defect) in a corresponding portion of the surface of the photoreceptor drum 30. Specifically, the printer CPU 61 determines whether there is the charge current detection period Pi in which the detected amount Δdi stored in the detected amount storage unit 643 exceeds a predetermined current threshold. If there is the charge current detection period Pi in which the detected amount Δdi exceeds the current threshold, the printer CPU 61 determines whether the detected amount Δdv of the primary transfer voltage detection period Pv corresponding to the charge current detection period Pi and stored in the detected amount storage unit 643 exceeds a predetermined voltage threshold. If the detected amount Δdv also exceeds the voltage threshold, the printer CPU 61 determines that there is abnormality at the position of the surface of the photoreceptor drum 30 corresponding to the position of the charge roller 31 in the charge current detection period Pi and corresponding to the position of the primary transfer roller 33 in the primary transfer voltage detection period Pv. Based on the determination that there is abnormality in the corresponding portion (YES in ACT106), the printer CPU 61 moves to a processing operation of ACT112 to be described below.

If the detected amount Δdi does not exceed the current threshold, or the detected amount Δdi exceeds the current threshold but the detected amount Δdv does not exceed the voltage threshold, the printer CPU 61 determines that there is no abnormality at the position of the surface of the photoreceptor drum 30 corresponding to the position of the charge roller 31 in the charge current detection period Pi and corresponding to the position of the primary transfer roller 33 in the primary transfer voltage detection period Pv. Based on the determination that there is not abnormality in the corresponding portion (NO in ACT106), the printer CPU 61 determines in ACT 107 whether the first sampling is ended. Specifically, the printer CPU 61 determines whether the application (e.g., implementation) of the charge roller detection voltage to the charge roller 31 in the charge current detection period Pi and the plurality of times of detections of the charge current were repeated at the predetermined time intervals by a defined number of times defined in advance. The defined number of times (e.g., pre-set cycles, designated iterations) is at least the number of times it is detected whether there is abnormality in the entire circumference of the surface of the photoreceptor drum 30. The defined number of times is defined based on a size of the circumference of the photoreceptor drum 30, a rotational speed, a length of the charge current detection period Pi, a length of the predetermined time interval, or the like. A time may be used for the definition rather than the number of times. Based on the determination that the first sampling is not ended (NO in ACT107), the printer CPU 61 moves to the processing operation of the foregoing ACT106.

Based on the determination that the first sampling is ended (YES in ACT107), the printer CPU 61 ends the calculation of the first period detected amount in ACT108. Specifically, the printer CPU 61 controls the image forming control unit 71 such that repetition of the application of the charge roller detection voltage to the charge roller 31 and the plurality of detections of the charge current is ended. Even if the calculation of the first period detected amount ends, the printer CPU 61 continues the second sampling and the processing operation of the calculation of the second period detected amount.

In ACT109, the printer CPU 61 determines whether the second sampling is ended. Specifically, the printer CPU 61 determines whether the application of the primary transfer roller detection current to the primary transfer rollers 33 in the primary transfer voltage detection period Pv and the plurality of times of detections of the primary transfer voltage at the predetermined time intervals were repeated a predetermined defined number of times or for a defined time. The defined number of times and the defined time are similar to those of the determination of the end of the first sampling. Based on the determination that the second sampling is ended (YES in ACT109), the printer CPU 61 moves to a processing operation of ACT111 to be described below.

Based on the determination that the second sampling is not ended (NO in ACT109), the printer CPU 61 determines in ACT110 whether there is abnormality in the corresponding portion of the surface of the photoreceptor drum 30. The determination is similar to that of ACT106. Based on the determination that there is abnormality in the corresponding portion (YES in ACT110), the printer CPU 61 moves to a processing operation (e.g., procedure execution, task implementation) of ACT112 to be described below. Conversely, based on the determination that there is no abnormality in the corresponding portion (NO in ACT110), the printer CPU 61 moves to the processing operation of the foregoing ACT109. If the calculation of the first period detected amount ends (e.g., terminates, concludes) in the foregoing ACT108, there is a period in which the second period detected amount is not calculated. Therefore, in the uncalculated period, it is not determined whether there is abnormality. By the second sampling continued after the calculation of the first period detected amount ends, a new detected amount Δdv is gradually calculated and an abnormality determination range is increased.

Based on the determination that the second sampling is ended (YES in ACT109), the printer CPU 61 ends the calculation of the second period detected amount in ACT111. Specifically, the printer CPU 61 controls the image forming control unit 71 such that repetition of the application of the primary transfer roller detection current to the primary transfer roller 33 and the plurality of times of detections of the primary transfer voltage is ended. The printer CPU 61 ends the processing operation illustrated in the flowchart.

Based on the determination that there is abnormality in the corresponding portion (YES in ACT106 or ACT110), the printer CPU 61 outputs a damage diagnosis in ACT112. Specifically, the printer CPU 61 notifies the system CPU 51 that damage is occurred in the photoreceptor drum 30. Thereafter, the printer CPU 61 ends the processing operation illustrated in the flowchart.

The system CPU 51 is notified by the printer CPU 61 that damage is occurred in the photoreceptor drum 30 and displays a damage occurrence alert of the photoreceptor drum 30 on the display unit 4*a* of the operation panel 4. The user viewing the display can request repair from a maintenance inspection company. The system CPU 51 may transmit a damage occurrence notification of the photoreceptor drum 30 to the server apparatus 300 (or server computing system) via the external interface 56. Accordingly, the server apparatus 300 can cause the repairman terminal 400 to prepare for repair of the image forming apparatus 100.

As described above, the printer CPU 61 of the image forming apparatus 100 according to the first embodiment detects whether there is abnormality at a certain position on the surface of the photoreceptor drum 30 in two portions of the position of the charge roller 31 and the position of the primary transfer rollers 33 through timing control according to rotation of the photoreceptor drum 30. If abnormality is detected at both portions, it is determined that damage such as a flaw or a fracture (e.g., defect) occurred at the certain position (e.g., specific location) of the surface of the photoreceptor drum 30. In the image forming apparatus 100 according to the first embodiment, the image forming apparatus 100 itself can check and determine whether there is abnormality occurred the photoreceptor drum 30. Accordingly, if there is a problem in the photoreceptor drum 30, countermeasures can be made quickly (promptly). Since the image forming apparatus 100 (or image forming computing system) according to the first embodiment can detect whether there is abnormality at the same position on the photoreceptor drum 30 at two portions, a risk of erroneous detection can be reduced.

By sufficiently (e.g., accurately, measurably) shortening the certain position at which it is detected whether there is abnormality than the entire circumference of the photoreceptor drum 30, it is possible to precisely detect whether there is abnormality. By repeatedly detecting whether there is abnormality, it is possible to set a plurality of positions on the photoreceptor drum 30 as detection targets. By adjusting the number of repetitions, it is possible to detect whether there is abnormality on the entire circumference of the surface of the photoreceptor drum 30.

Second Embodiment

Figure 15:
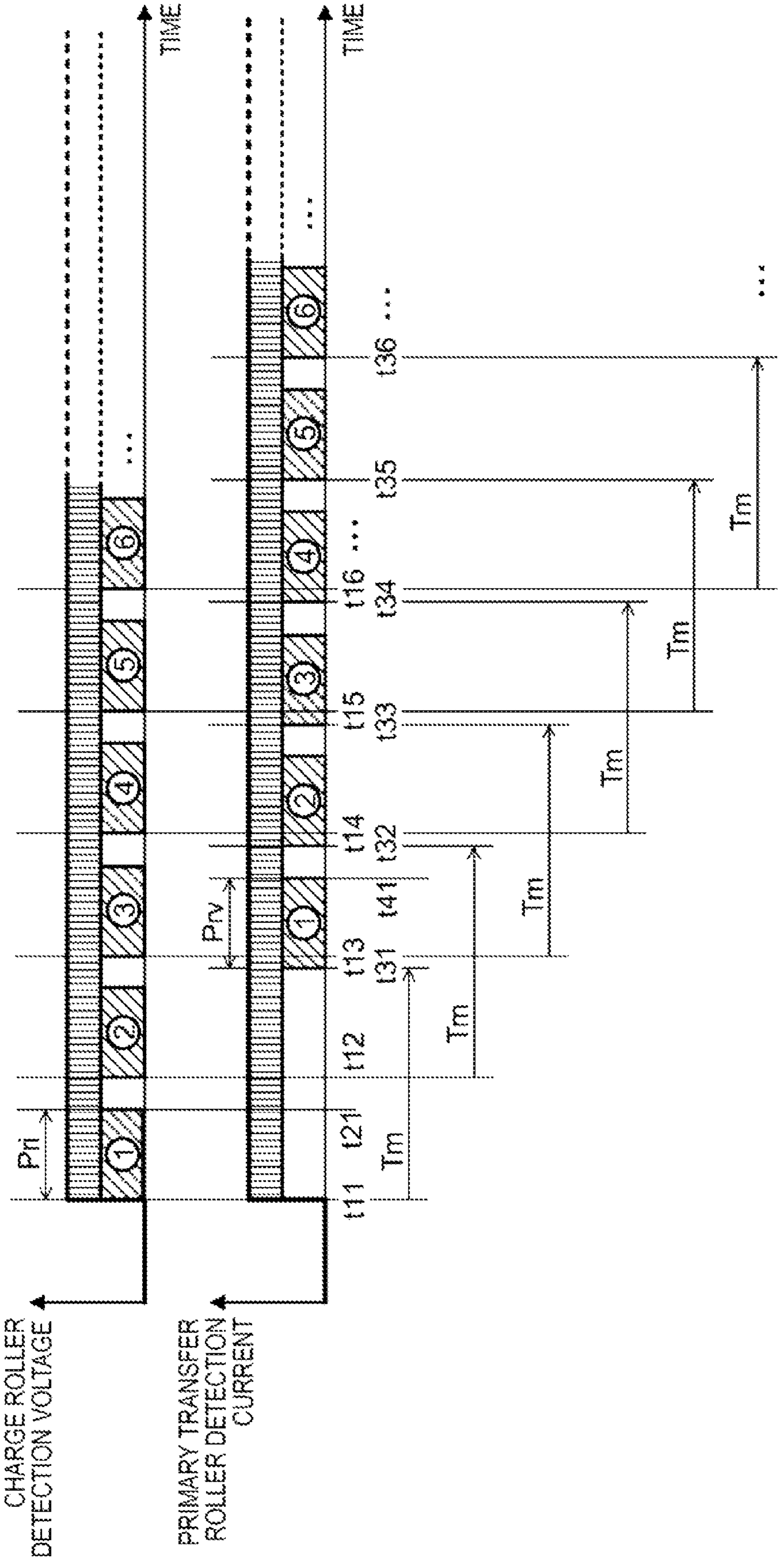
FIG. 15 is a timing chart illustrating repeated detection in an image forming apparatus of an image forming system according to a second embodiment.

FIG. 15 is a timing chart illustrating repeated detection in the image forming apparatus 100 of an image forming system according to a second embodiment. In the above-described first embodiment, it is assumed that application of the charge roller detection voltage and a plurality of times of detections of the charge current in the charge current detection period Pi, and application of the primary transfer roller detection current and a plurality of times of detections of the primary transfer voltage in the primary transfer voltage detection period Pv are repeated at predetermined every other time intervals. In the second embodiment, as illustrated in FIG. 15, the charge roller detection voltage is applied continuously (e.g., iteratively) and the charge current is detected repeatedly (e.g., recurrently) during voltage application (e.g., voltage supply), and the primary transfer roller detection current is applied continuously and the primary transfer voltage is repeatedly detected during current application.

Figures 16, 17:
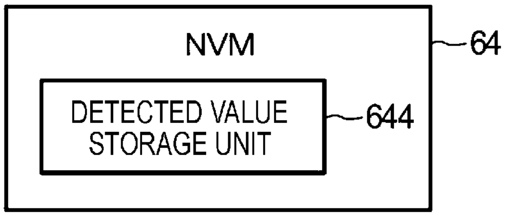
FIG. 16 is a block diagram illustrating a configuration example of a nonvolatile memory of a printer of the image forming apparatus.
FIG. 17 is a diagram illustrating an example of stored content of a detected value storage unit included in a nonvolatile memory.

FIG. 16 is a block diagram illustrating a configuration example of the nonvolatile memory 64 of the printer 2 of the image forming apparatus 100 according to the embodiment. In the embodiment, the nonvolatile memory 64 can include, for example, a detected value storage unit 644 (or detected value storage system) that stores a detected value of the charge current (e.g., electric flow) and a detected value of the primary transfer voltage (e.g., transmission voltage).

FIG. 17 is a diagram illustrating an example of storage content of the detected value storage unit 644. In the embodiment, the detected value storage unit 644 stores each detected value detected repeatedly during continuous application of the charge roller detection voltage and the primary transfer roller detection current in association with a detected value ID for distinguishing the detected current value di from the detected voltage value dv. A record of the detected value storage unit 644 that stores the detected current value di is a first memory that stores a first detected value, and a record of the detected value storage unit 644 that stores the detected voltage value dv is a second memory that stores a second detected value. FIG. 17 illustrates an example in which the detected values are detected N times during the continuous application.

Figure 18:
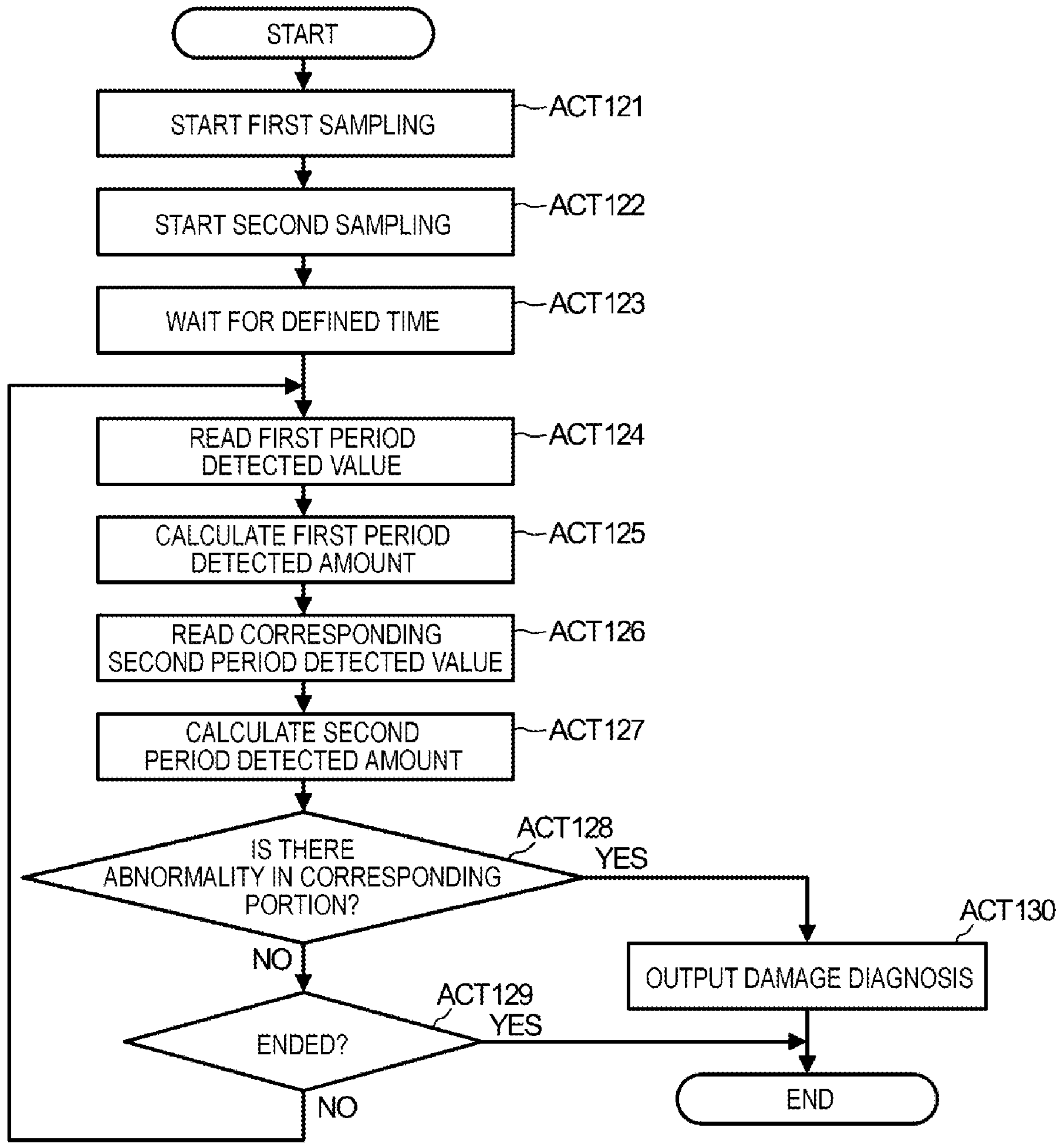
FIG. 18 is a flowchart illustrating an example of a damage diagnosis processing operation by the printer of the image forming apparatus.

FIG. 18 is a flowchart illustrating an example of a damage diagnosis processing operation (e.g., verification procedure) by the printer 2 of the image forming apparatus 100 according to the second embodiment.

In ACT121, the printer CPU 61 starts first sampling at a time t11. Specifically, the printer CPU 61 controls an image forming control unit 71 such that the charge roller detection voltage is applied from the charge bias power supply 81 to the charge roller 31 and the charge current detection unit 83 starts detecting the charge current repeatedly. The printer CPU 61 receives the detected current value di of the charge current detected by the charge current detection unit 83 from the image forming control unit 71 and stores the detected current value di in the detected value storage unit 644 of the nonvolatile memory 64.

In ACT122, the printer CPU 61 starts second sampling at the same time t11. Specifically, the printer CPU 61 controls the image forming control unit 71 such that the primary transfer roller detection current is applied from the primary transfer bias power supply 82 to the primary transfer rollers 33 and the primary transfer voltage detection unit 84 starts detecting the primary transfer voltage repeatedly. The printer CPU 61 receives the detected voltage value dv of the primary transfer voltage detected by the primary transfer voltage detection unit 84 from the image forming control unit 71 (or image forming control system) and stores the detected voltage value dv in the detected value storage unit 644 of the nonvolatile memory 64.

In ACT123, the printer CPU 61 waits during a given time. The given time is a time in which the defined time Tm for waiting for detection of the primary transfer voltage corresponding to the charge current detected at the time t11 after moving the surface position of the photoreceptor drum 30 by a distance D and a defined period corresponding to the charge current detection period Pi and the primary transfer voltage detection period Pv described in the first embodiment are combined.

In ACT124, the printer CPU 61 reads the first period detected value from the detected value storage unit 644. Specifically, the printer CPU 61 reads the detected current values di in a charge current reading period Pri corresponding to the charge current detection period Pi among time-series detected current values di (e.g., a plurality of detected current values) of the charge current stored in the detected value storage unit 644. For example, the printer CPU 61 reads the detected current values di in a period from time t11 to t21. The plurality of read detected values di are stored in a temporary storage area provided in the RAM 62.

In ACT125, the printer CPU 61 calculates the first period detected amount. Specifically, the printer CPU 61 calculates a detected amount Δdi which is a difference between a maximum value $di_{max}$ and a minimum value $di_{min}$ at the detected current values di in the read charge current reading period Pri. The calculated detected amount Δdi is stored in a temporary storage area provided in the RAM 62. Here, the plurality of temporarily stored detected current values di may be deleted.

In ACT126, the printer CPU 61 reads a second period detected value from the detected value storage unit 644. Specifically, the printer CPU 61 reads the detected voltage values dv in a primary transfer voltage reading period Prv corresponding to the primary transfer voltage detection period Pv among time-series detection voltage values dv (e.g., a plurality of detection voltage values) of the primary transfer voltage stored in the detected value storage unit 644. For example, the printer CPU 61 reads detected voltage values dv in a period from time t31 to t41. The plurality of read detected voltage values dv are stored in a temporary storage area provided in the RAM 62.

In ACT127, the printer CPU 61 calculates a second period detected amount. Specifically, the printer CPU 61 calculates a detected amount Δdv which is a difference between a maximum value dvmax and a minimum value dvmin at the detected voltage values dv in the read primary transfer voltage reading period Prv. The calculated detected amount Δdv is stored in a temporary storage area provided in the RAM 62. Here, the plurality of temporarily stored detected voltage values dv may be deleted.

In ACT128, the printer CPU 61 determines whether there is abnormality in a corresponding portion of the surface of the photoreceptor drum 30. Specifically, the printer CPU 61 determines whether the calculated detected amount Δdi exceeds a predetermined current threshold. If the detected amount Δdi exceeds the current threshold, the printer CPU 61 further determines whether the calculated detected amount Δdv exceeds a predetermine voltage threshold. If the detected amount Δdv also exceeds the voltage threshold, the printer CPU 61 determines that there is abnormality at the position of the surface of the photoreceptor drum 30 corresponding to the position of the charge roller 31 in the corresponding charge current reading period Pri and the position of the primary transfer rollers 33 in the corresponding primary transfer voltage reading period Prv. The corresponding charge current reading period Pri is a charge current reading period Pri in which the detected current value di which is a calculation source of the detected amount Δdi determined to exceed the current threshold is read. The corresponding primary transfer voltage reading period Prv is a primary transfer voltage reading period Prv in which the detected voltage value dv which is a calculation source of the detected amount Δdv determined to exceed the voltage threshold is read. Based on the determination that there is abnormality in the corresponding portion (YES in ACT128), the printer CPU 61 moves to a processing operation of ACT130 to be described below.

If the detected amount Δdi does not exceed the current threshold, or the detected amount Δdi exceeds the current threshold but the detected amount Δdv does not exceed the voltage threshold, the printer CPU 61 determines that there is no abnormality (e.g., normal condition) in the corresponding portion. Based on the determination that there is no abnormality in the corresponding portion (NO in ACT128), the printer CPU 61 determines in ACT129 whether the damage diagnosis processing operation ends. Specifically, the printer CPU 61 determines whether the determination processing operation of ACT128 is performed a defined (e.g., set, determined) number of times. The defined number of times is at least the number of times detecting whether there is abnormality on the entire circumference of the surface of the photoreceptor drum 30. Alternatively, the end may be determined based on whether the number of detected voltage values dv of the primary transfer voltage stored in the detected value storage unit 644 exceeds the number of detected voltage values necessary (e.g., sufficient, recommended) for the number of times detecting whether there is abnormality on the entire circumference of the surface of the photoreceptor drum 30. Instead of a number such as the number of times or the number of detected voltage values, a time necessary for detecting whether there is abnormality on the entire circumference of the surface of the photoreceptor drum 30 may be used as a determination reference (e.g., assessment criterion, evaluation benchmark). Based on the determination that the damage diagnosis processing operation ends (YES in ACT129), the printer CPU 61 ends the processing operation illustrated in the flowchart.

Based on the determination that there is abnormality in the corresponding portion (YES in ACT128), the printer CPU 61 outputs a damage diagnosis (e.g., fault or defect analysis) in ACT130. Specifically, the printer CPU 61 notifies the system CPU 51 that damage is occurred in the photoreceptor drum 30. The operation of the system CPU 51 notified of occurrence of damage of the photoreceptor drum 30 by the printer CPU 61 was described in the first embodiment. Thereafter, the printer CPU 61 ends the processing operation illustrated in the flowchart.

As described above, the printer CPU 61 of the image forming apparatus 100 according to the second embodiment detects whether there is abnormality at a certain position (e.g., location) on the surface of the photoreceptor drum 30 in two portions of the position of the charge roller 31 and the position of the primary transfer rollers 33 through reading control of the detected values according to rotation of the photoreceptor drum 30. If abnormality is detected at both portions, it is determined that damage such as a flaw or a fracture occurred at the certain position of the surface of the photoreceptor drum 30. Accordingly, it is possible to obtain advantages similar to those of the first embodiment in the image forming apparatus 100 according to the second embodiment as well.

Third Embodiment

In the first and second embodiments, all of the damage diagnosis operation of the photoreceptor drum 30 is performed in the image forming apparatus 100. A third embodiment is an example of a case where a part of the damage diagnosis operation is performed in the server apparatus 300.

Figure 19:
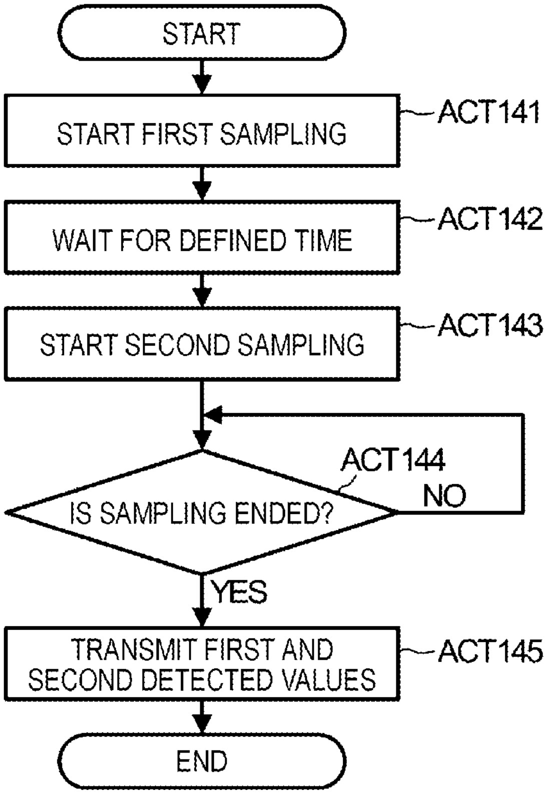
FIG. 19 is a flowchart illustrating an example of a detection processing operation in an image forming apparatus of an image forming system according to a third embodiment.

FIG. 19 is a flowchart illustrating an example of a detection processing operation in the image forming apparatus 100 of an image forming system according to the third embodiment.

In ACT141, the printer CPU 61 starts first sampling. The processing operation is similar to the processing operation of ACT101 according to the first embodiment. The printer CPU 61 controls the image forming control unit 71 such that application (e.g., process, procedure) of the charge roller detection voltage to the charge roller 31 and a plurality of times of detections of the charge current start to repeat at predetermined time intervals. The printer CPU 61 stores the detected current value di of the charge current detected by the charge current detection unit 83 in the first detected value storage unit 641.

In ACT142, the printer CPU 61 waits during the defined time Tm.

In ACT143, the printer CPU 61 starts second sampling. The processing operation is similar to the processing operation of ACT104 according to the first embodiment. The printer CPU 61 controls the image forming control unit 71 such that application of the primary transfer roller detection current to the primary transfer rollers 33 and a plurality of times of detections of the primary transfer voltage start to repeat at predetermined time intervals. The printer CPU 61 stores the detected voltage value dv of the primary transfer voltage detected by the primary transfer voltage detection unit 84 in the second detected value storage unit 642.

In ACT144, the printer CPU 61 determines whether both the first sampling and the second sampling are ended (e.g., completed, concluded). Since the first sampling ends earlier, the printer CPU 61 may determine whether the second sampling is ended. The processing operation is similar to the processing operation of ACT109 according to the first embodiment. The printer CPU 61 determines whether the application of the primary transfer roller detection current to the primary transfer rollers 33 in the primary transfer voltage detection period Pv and the plurality of times of detections of the primary transfer voltage at the predetermined time intervals were repeated a predetermined defined number of times or for a defined time. Based on the determination that the sampling is not ended (NO in ACT144), the printer CPU 61 repeatedly performs the processing operation of ACT144.

Based on the determination that the samplings are ended (YES in ACT144), the printer CPU 61 transmits first and second detected values to the server apparatus 300 (or server system) in ACT145. Specifically, the printer CPU 61 transmits the detected current value di of the charge current in each charge current detection period Pi stored in the first detected value storage unit 641 as a first detected value, and the detected voltage value dv of the primary transfer voltage in each primary transfer voltage detection period Pv stored in the second detected value storage unit 642 as a second detected value to the system CPU 51. Thereafter, the printer CPU 61 ends the processing operation illustrated in the flowchart.

The system CPU 51 transmits the first and second detected values from the printer CPU 61 to the server apparatus 300 via the external interface 56.

Figure 20:
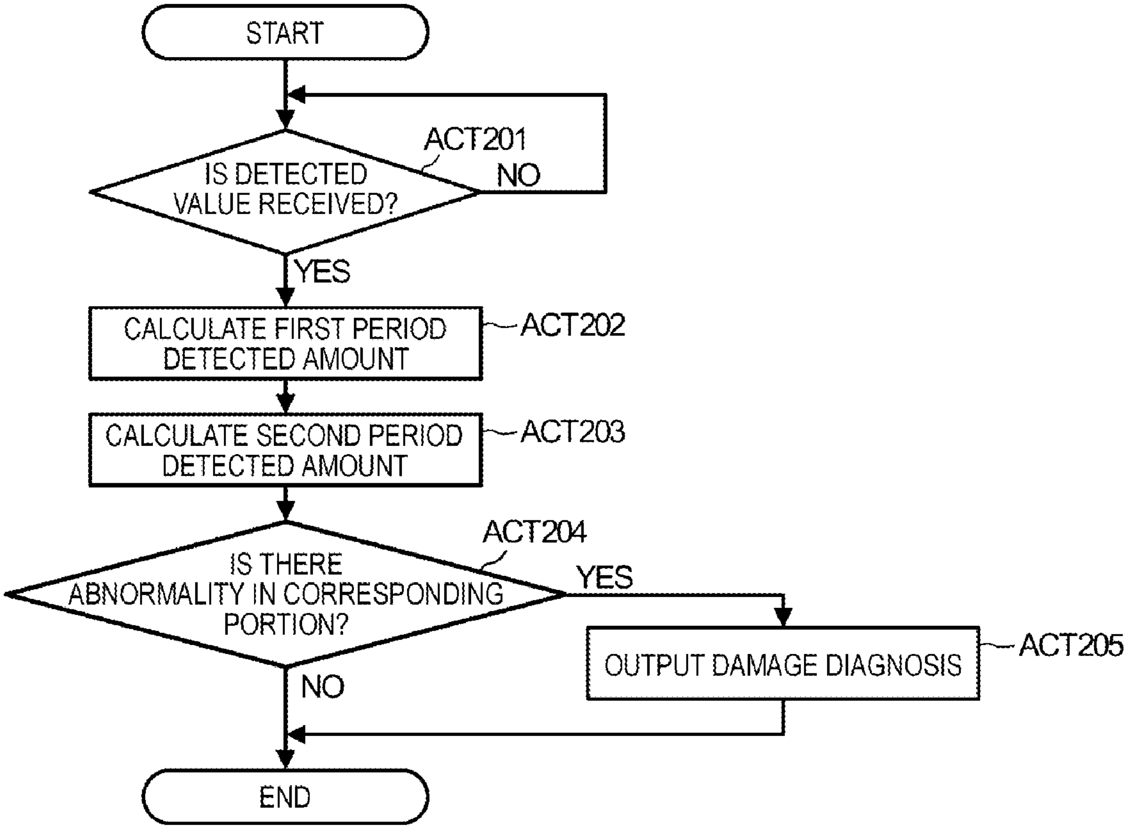
FIG. 20 is a flowchart illustrating an example of a determination processing operation in a server apparatus of the image forming system.

FIG. 20 is a flowchart illustrating an example of a determination processing operation in the server apparatus 300 of the image forming system according to the third embodiment.

In ACT201, the server apparatus 300 determines whether a detected value from any image forming apparatus 100 is received. Based on the determination that the detected value is not received (NO in ACT201), the server apparatus 300 repeats the processing operation of ACT201.

Based on the determination that the detected value is received (YES in ACT201), the server apparatus 300 (or server computing system) calculates a first period detected amount (e.g., interval measurement) in ACT202. Specifically, the server apparatus 300 calculates the detected amount Δdi in each charge current detection period Pi from the detected current value di of the charge current in each charge current detection period Pi which is the first detected value received from the image forming apparatus 100.

In ACT203, the server apparatus 300 calculates a second period detected amount. Specifically, the server apparatus 300 calculates the detected amount Δdv in each primary transfer voltage detection period Pv from the detected voltage value dv of the primary transfer voltage of each primary transfer voltage detection period Pv which is the second detected value received from the image forming apparatus 100.

In ACT204, the server apparatus 300 determines whether there is abnormality in corresponding portion of the surface of the photoreceptor drum 30. Specifically, the server apparatus 300 determines whether there is a detected amount Δdi exceeding a predetermined current threshold in the detected amounts Δdi calculated in ACT202. If there is a detected amount Δdi exceeding the current threshold, the server apparatus 300 determines whether the detected amount Δdv calculated in ACT203 exceeds a predetermined voltage threshold during the primary transfer voltage detection period Pv corresponding to the charge current detection period Pi of the detected amount Δdi exceeding the current threshold. If the detected amount Δdv also exceeds the voltage threshold, the server apparatus 300 determines that there is abnormality at the position of the surface of the photoreceptor drum 30 corresponding to the position of the charge roller 31 in the charge current detection period Pi and the position of the primary transfer rollers 33 in the primary transfer voltage detection period Pv. Based on the determination that there is no abnormality in the corresponding portion (NO in ACT204), the server apparatus 300 ends the processing operation illustrated in the flowchart.

Based on the determination that there is abnormality in the corresponding portion (YES in ACT204), the server apparatus 300 outputs a damage diagnosis in ACT205. Specifically, the server apparatus 300 transmits a damage occurrence notification of the photoreceptor drum 30 to the corresponding image forming apparatus 100. The server apparatus 300 can cause the repairman terminal 400 (or repairmen computing system) to prepare for repair of the corresponding image forming apparatus 100 via a network.

The system CPU 51 of the image forming apparatus 100 (or image forming computing system) receiving the damage occurrence notification of the photoreceptor drum 30 via the external interface 56 instructs the printer CPU 61 to stop the printing operation. The system CPU 51 displays a damage occurrence alert of the photoreceptor drum 30 on the display unit 4*a* (or display system) of the operation panel 4. The user viewing the display can request repair from a maintenance inspection company.

The damage diagnosis processing operation according to the third embodiment was described in association with the damage diagnosis processing operation according to the first embodiment, but it is needless to say that a part of the damage diagnosis processing operation according to the second embodiment can be also performed in the server apparatus 300.

As described above, the image forming system according to the third embodiment performs the damage diagnosis processing operation by the image forming apparatus 100 according to the first or second embodiment in cooperation with the image forming apparatus 100 and the server apparatus 300. Accordingly, even in the image forming system according to the third embodiment, it is possible to obtain advantages similar to those of the first embodiment.

The first, second, and third embodiments was described above, but embodiments are not limited thereto.

For example, in the first, second, and third embodiments, the image forming apparatus 100 that forms an image with four YMCK colors was described as an example, but the image forming apparatus may be an image forming apparatus for a single color such as black.

In the first, second, and third embodiments, a voltage is applied to the charge roller 31 to detect a current and a current is applied to the primary transfer rollers 33 to detect a voltage. Conversely, a current may be applied to the charger roller 31 to detect a voltage and a voltage may be applied to the primary transfer rollers 33 to detect a current. Currents may be applied to both the charge roller 31 and the primary transfer rollers 33 to detect voltages. Conversely, voltages may be applied to both the charge roller 31 and the primary transfer rollers 33 to detect currents. The method to use may be determined according to a type of a high-voltage transformer used in a bias power supply.

In the determination of abnormality in the corresponding portion in ACT106, ACT110, ACT128, and ACT204 in the first, second, and third embodiments, the determination based on the detected amount Δdi of the charge current and the determination based on the detected amount Δdv of the primary transfer voltage was made in this order, but the determinations may be made in the reverse order.

A flow of the processing operations described with reference to the flowcharts is not limited to the described order. For example, the processing operation of ACT121 and the processing operation of ACT122 illustrated in FIG. 18 may be performed in a reverse order or in parallel. As such, an order of several steps may be interchanged or several steps may be performed simultaneously in parallel. The processing content of several steps may be corrected.

In the foregoing embodiment, as described above, a control program is stored in advance in the nonvolatile memory 64 of the printer 2 of the image forming apparatus 100. However, a control program entrusted separately from the image forming apparatuses may be written on a writable storage device included in the image forming apparatus 100 through an operation of a manager or the like. The entrustment of the control program or the like can be implemented by storing the control program in a removable computer-readable storage medium or performing communication via a network. A form of the computer-readable storage medium does not matter as long as the medium can store a program and a device can read the program like a CD-ROM or a memory card.

While certain embodiments have been described, these embodiments have been presented by way of example only, and are not intended to limit the scope of the disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

What is claimed is:

1. An image forming system, comprising:

a cylindrical photoreceptor system configured to have a rotational shaft in a longitudinal direction;

a first detection system configured to detect whether there is at least one abnormality on a surface of the cylindrical photoreceptor system at a first position;

a second detection system configured to detect whether there is the at least one abnormality on the surface of the cylindrical photoreceptor system at a second position;

a controller configured to cause the second detection system to start detecting of the at least one abnormality at a point in time after a waiting time, wherein the waiting time corresponds to a time for the cylindrical photoreceptor system to rotate by a distance between the first position and the second position subsequent to the first detection system starting the detection of the at least one abnormality;

a determination system configured to determine damage occurred at a surface position of the surface of the cylindrical photoreceptor system when the second detection system detects the at least one abnormality at the surface position of the cylindrical photoreceptor system at which the first detection system detected the at least one abnormality;

wherein the first detection system, disposed adjacent to the surface of the cylindrical photoreceptor system, detects whether there is the at least one abnormality based on a first detected value of at least one of a voltage or a current contingent upon the voltage or the current being applied to a charger roller charging the surface of the cylindrical photoreceptor system;

wherein the second detection system detects whether there is the at least one abnormality based on a second detected value of at least one of the voltage or the current contingent upon the voltage or the current being applied to a transfer roller interposing a transfer target to which an image formed on the cylindrical photoreceptor system is transferred together with the cylindrical photoreceptor system;

the first detection system comprising:

a first detected value acquisition system configured to apply the voltage or the current to the charger roller for a first defined period and detect the first detected value corresponding to the voltage or the current being applied over the first defined period; and a first abnormality detection system configured to detect the at least one abnormality based on whether a first difference between one or more maximum values and one or more minimum values of the first detected value stored in a first storage unit and detected during the first defined period exceeds a first threshold; and the second detection system comprising:

a second detected value acquisition system configured to apply the voltage or the current to the transfer roller for a second defined period and detects the second detected value corresponding to the voltage or the current being applied over the second defined period; and a second abnormality detection system configured to detect the at least one abnormality based on whether a second difference between one or more maximum values and one or more minimum values of the second detected value stored in a second storage unit and detected during the second defined period exceeds a second threshold.

2. The image forming system of claim 1, further comprising:

the image forming system configured to communicate, via a network, with a user terminal system transmitting image data of an image to be formed and configured to form an image based on the image data, wherein the image forming system comprises the cylindrical photoreceptor system, the first detection system, the second detection system, the controller, and the determination system.

3. The image forming system of claim 1, further comprising:

the image forming system further comprising the first detected value acquisition system of the first detection system, the second detected value acquisition system of the second detection system; and a server system comprising the first abnormality detection system of the first detection system, the second abnormality detection system of the second detection system, and the determination system and capable of communicating with the image forming system via a network, wherein the first detected value acquisition system and the second detected value acquisition system of the image forming system transmit the first detected value and the second detected value to the server system via the network.

4. The image forming system of claim 1, wherein the controller controls a start timing of the second defined period using a start time point of the first defined period as a base point based on the waiting time.

5. The image forming system of claim 1, wherein:

the first detected value acquisition system comprises a first memory that stores the first detected value;

the second detected value acquisition system comprises a second memory that stores the second detected value; and the controller is configured to (1) correlate the first detected value used by the first abnormality detection system of a plurality of first detected values stored in the first memory, (2) correlate the second detected value used by the second abnormality detection system of a plurality of second detected values stored in the second memory and corresponding to the first detected value used by the first abnormality detection system based on the waiting time.

6. The image forming system of claim 1, wherein the first defined period and the second defined period are shorter than one rotation of the cylindrical photoreceptor system.

7. The image forming system of claim 6, wherein the controller causes the first detection system and the second detection system to operate repeatedly.

8. The image forming system of claim 7, wherein the controller causes the first detection system and the second detection system to operate repeatedly by a number of times the first detection system and the second detection system detect whether there is one or more abnormalities on a circumference of the surface of the cylindrical photoreceptor system.

9. A method, comprising:

detecting, by a first detection system of an image forming system, whether there is at least one abnormality on a surface of a cylindrical photoreceptor system at a first position;

causing, by a controller of the image forming system, a second detection system to start detecting whether there is the at least one abnormality on the surface of the cylindrical photoreceptor system at a second position, wherein detecting starts at a point in time after a waiting time, wherein the waiting time corresponds to a time for the cylindrical photoreceptor system to rotate by a distance between the first position and the second position subsequent to the first detection system starting the detection of the at least one abnormality;

determining, by a determination system of the image forming system, damage occurred at a surface position of the surface of the cylindrical photoreceptor system when the second detection system detects the at least one abnormality at the surface position of the cylindrical photoreceptor system at which the first detection system detected the at least one abnormality;

detecting, by the first detection system disposed adjacent to the surface of the cylindrical photoreceptor system, whether there is the at least one abnormality based on a first detected value of at least one of a voltage or a current contingent upon the voltage or the current being applied to a charger roller charging the surface of the cylindrical photoreceptor system;

detecting, by the second detection system, whether there is the at least one abnormality based on a second detected value of at least one of the voltage or the current contingent upon the voltage or the current being applied to a transfer roller interposing a transfer target to which an image formed on the cylindrical photoreceptor system is transferred together with the cylindrical photoreceptor system;

applying, by the first detection system, the voltage or the current to the charger roller for a first defined period and detect the first detected value corresponding to the voltage or the current being applied over the first defined period;

detecting, by the first detection system, the at least one abnormality based on whether a first difference between one or more maximum values and one or more minimum values of the first detected value stored in a first storage unit and detected during the first defined period exceeds a first threshold;

applying, the second detection system, the voltage or the current to the transfer roller for a second defined period and detects the second detected value corresponding to the voltage or the current being applied over the second defined period; and detecting, the second detection system, the at least one abnormality based on whether a second difference between one or more maximum values and one or more minimum values of the second detected value stored in a second storage unit and detected during the second defined period exceeds a second threshold.

10. The method of claim 9, further comprising:

communicating, by the image forming system via a network, with a user terminal system transmitting image data of an image to be formed; and forming an image based on the image data, wherein the image forming system comprises the cylindrical photoreceptor system, the first detection system, the second detection system, the controller, and the determination system.

11. The method of claim 9, further comprising:

transmitting, by either the first detection system or the second detection system, the first detected value and the second detected value to a server system via a network.

12. The method of claim 9, further comprising:

starting, by the controller, timing of the second defined period using a start time point of the first defined period as a base point based on the waiting time.

13. The method of claim 9, further comprising:

correlating, by the controller, the first detected value used by the first detection system of a plurality of first detected values stored in a first memory; and correlating, by the controller, the second detected value used by the second detection system of a plurality of second detected values stored in a second memory and corresponding to the first detected value used by the first detection system based on the waiting time.

14. The method of claim 9, wherein the first defined period and the second defined period are shorter than one rotation of the cylindrical photoreceptor system.

15. The method of claim 9, further comprising:

causing, by the controller, the first detection system and the second detection system to operate repeatedly by a number of times the first detection system and the second detection system detect whether there is one or more abnormalities on a circumference of the surface of the cylindrical photoreceptor system.

16. An image forming system, comprising:

a cylindrical photoreceptor system configured to have a rotational shaft in a longitudinal direction;

a controller configured to cause a second detection system to start detecting of at least one abnormality at a point in time after a waiting time, wherein the waiting time corresponds to a time for the cylindrical photoreceptor system to rotate by a distance between a first position and a second position subsequent to a first detection system starting a detection of the at least one abnormality;

a determination system configured to determine a defect occurred at a surface position of a surface of the cylindrical photoreceptor system when the second detection system detects the at least one abnormality at the surface position of the cylindrical photoreceptor system at which the first detection system detected the at least one abnormality;

wherein the first detection system, disposed adjacent to the surface of the cylindrical photoreceptor system, detects whether there is the at least one abnormality based on a first detected value of at least one of a voltage or a current contingent upon the voltage or the current being applied to a charger roller charging the surface of the cylindrical photoreceptor system;

wherein the second detection system detects whether there is the at least one abnormality based on a second detected value of at least one of the voltage or the current contingent upon the voltage or the current being applied to a transfer roller interposing a transfer target to which an image formed on the cylindrical photoreceptor system is transferred together with the cylindrical photoreceptor system;

the first detection system comprising:

a first detected value acquisition system configured to apply the voltage or the current to the charger roller for a first defined period and detect the first detected value corresponding to the voltage or the current being applied over the first defined period; and a first abnormality detection system configured to detect the at least one abnormality based on whether a first difference between one or more maximum values and one or more minimum values of the first detected value stored in a first storage unit and detected during the first defined period exceeds a first threshold;

the second detection system comprising:

a second detected value acquisition system configured to apply the voltage or the current to the transfer roller for a second defined period and detects the second detected value corresponding to the voltage or the current being applied over the second defined period; and a second abnormality detection system configured to detect the at least one abnormality based on whether a second difference between one or more maximum values and one or more minimum values of the second detected value stored in a second storage unit and detected during the second defined period exceeds a second threshold.

* * * * *